US011750688B2

(12) United States Patent
Ritter

(10) Patent No.: US 11,750,688 B2
(45) Date of Patent: Sep. 5, 2023

(54) COST-AWARE INTEGRATION PROCESS MODELING IN MULTI-CLOUD COMPUTING ENVIRONMENT

(71) Applicant: SAP SE, Walldorf (DE)

(72) Inventor: Daniel Ritter, Heidelberg (DE)

(73) Assignee: SAP SE, Walldorf (DE)

( * ) Notice: Subject to any disclaimer, the term of this patent is extended or adjusted under 35 U.S.C. 154(b) by 130 days.

(21) Appl. No.: 17/373,094

(22) Filed: Jul. 12, 2021

(65) Prior Publication Data

US 2023/0028947 A1    Jan. 26, 2023

(51) Int. Cl.
*H04L 67/10* (2022.01)
*G06Q 10/04* (2023.01)

(52) U.S. Cl.
CPC ............ *H04L 67/10* (2013.01); *G06Q 10/04* (2013.01)

(58) Field of Classification Search
CPC .............................. H04L 67/10; G06Q 10/04
See application file for complete search history.

(56) References Cited

U.S. PATENT DOCUMENTS

| | | | |
|---|---|---|---|
| 9,871,848 B1 * | 1/2018 | Shanmugam | G06Q 10/103 |
| 2013/0263120 A1 * | 10/2013 | Patil | G06F 9/45558 |
| | | | 718/1 |
| 2016/0036838 A1 * | 2/2016 | Jain | H04L 63/1416 |
| | | | 726/23 |
| 2019/0130121 A1 * | 5/2019 | Birn | G06F 16/2365 |
| 2021/0090301 A1 * | 3/2021 | Mammou | G06T 7/11 |
| 2021/0176266 A1 * | 6/2021 | Ramamurthy | G06F 9/5077 |
| 2022/0414518 A1 * | 12/2022 | You | G06N 10/60 |

* cited by examiner

Primary Examiner — Joseph L Greene
(74) Attorney, Agent, or Firm — Buckley, Maschoff & Talwalkar LLC

(57) ABSTRACT

Methods and systems may be associated with application integration in a multi-cloud computing environment. A modeling platform may determine a pattern composition for an integration process associated with a business application. A cost-aware platform may transform a decomposed version of the pattern composition, including a plurality of integration pattern contract graphs, into a multi-cloud cost problem optimization representation. An initial solution to the cost problem representation may be calculated using a modified first fit decreasing bin packing or similar algorithm to determine a configuration of multi-cloud containers and integration pattern contract graph container assignments. The system may then iteratively and locally improve the solution to by applying feasible transformations to create variant container configurations and integration pattern contract graph container assignments that are evaluated based on multi-cloud costs (keeping the user in-the-loop). When a termination criteria is satisfied, an indication of the improved solution may be output.

21 Claims, 30 Drawing Sheets

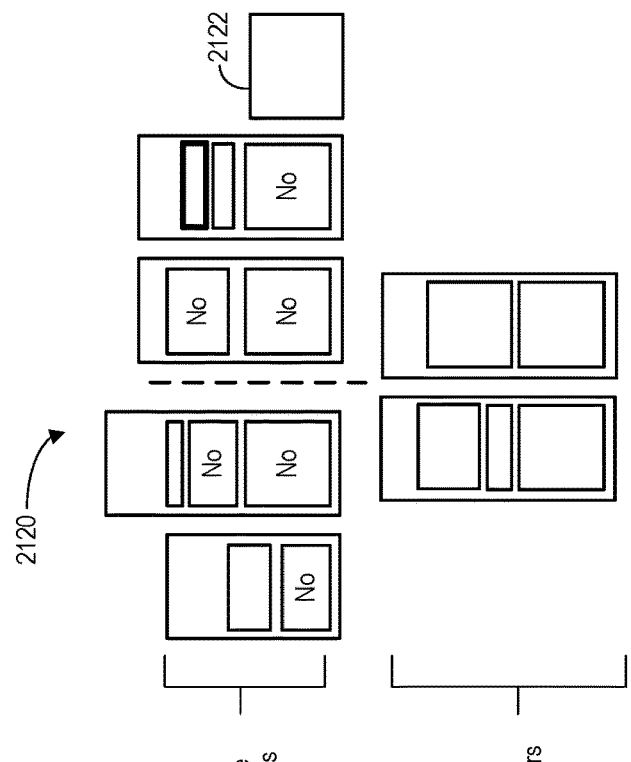
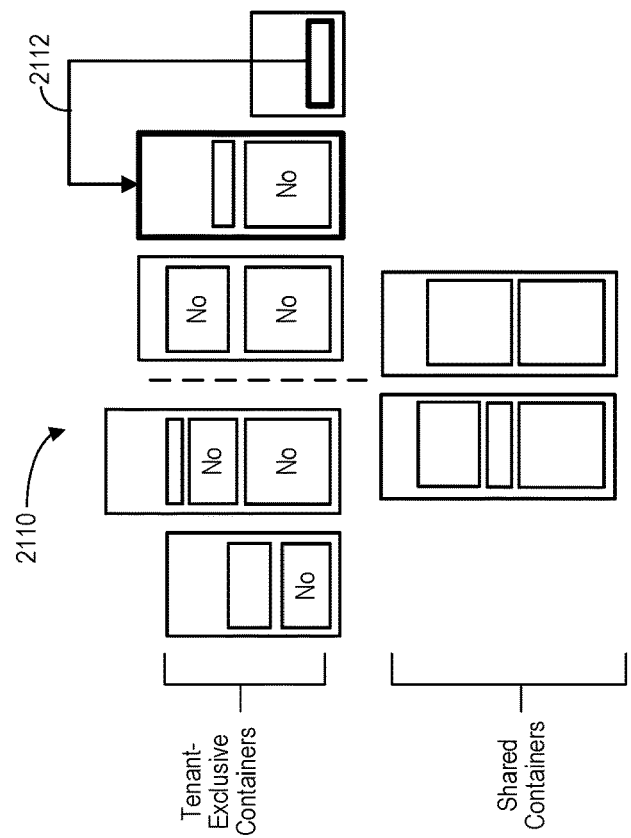
FIG. 21A
FIG. 21B

COST-AWARE INTEGRATION PROCESS MODELING IN MULTI-CLOUD COMPUTING ENVIRONMENT

BACKGROUND

Recent business, technology, and social trends (e.g., business networks, cloud and mobile computing, and social media) lead to a modularization and distribution of business applications in cloud computing environments. For example, FIG. 1 illustrates a system 100 supported by cloud integration 150 according to some embodiments. The cloud integration 150 may interface with mobile applications 110 (such as those associated with micro-service architectures), cloud applicants and business networks 120, on-premise and/or hybrid applications 130, and connected things or devices (e.g., cars, home appliances, etc.). The system 100 may utilize Integration as a Service ("INTaaS") to help customers develop integration processes (e.g., 30,000 customers may run 170,000 processes).

In some cases, integration processes may be run on more than a single cloud computing environment. For example, FIG. 2 is a system 200 associated with a cloud computing environment in accordance with some embodiments. In particular, an integration process 230 might run on a single cloud 210 (e.g., SAP® cloud platform 212) or in a multi-cloud environment 220 (e.g., associated with AMAZON® Web Services ("AWS") 222, MICROSOFT® Azure, etc.). The multi-cloud environment 220 may reduce single vendor reliance, provide cost efficiencies, provide customers with greater flexibility, etc. On the other hand, security may be more complicated as compared to the single cloud 210 (e.g., to ensure tenant privacy), and the selection of the right provider for a particular integration process 230 may not be straightforward. For example, running a first portion of a business application securely in one cloud while running a second portion of the application in another cloud might provide a customer with cost savings.

It would therefore be desirable to provide cost-aware integration in a secure, automatic, and efficient manner.

SUMMARY

INTaaS is a centerpiece of current corporate, cloud, and device integration processes. Compositions of integration patterns denote the required integration logic as integration processes, which typically run in a single cloud. As multi-cloud settings gain prominence, the selection of the best option for a specific problem is currently not realized. For example, security constraints are handled in a cost-insensitive manner for INTaaS vendors (which can lead to security vs. costs goal conflict) and may be non-transparent to a process modeler. Some embodiments described herein use a design-time placement for processes in multi-clouds that is cost-optimal for INTaaS problem sizes and respects customers' configurable security constraints. To make the solution tractable for larger, productive INTaaS processes, the approach may be relaxed by using a local search heuristic (and complemented by correctness-preserving model decomposition). This may provide a novel perspective for cost-aware process modeling from a process modeler's perspective.

According to some embodiments, methods and systems may be associated with application integration in a multi-cloud computing environment. A modeling platform may determine a pattern composition for an integration process associated with a business application. A cost-aware platform may transform a decomposed version of the pattern composition, including a plurality of integration pattern contract graphs, into a multi-cloud cost problem optimization representation. An initial solution to the cost problem representation may be calculated using an algorithm (e.g., a modified first fit decreasing bin packing algorithm) to determine a configuration of multi-cloud containers and integration pattern contract graph container assignments. The system may then iteratively and locally improve the solution by applying feasible transformations to create variant container configurations and integration pattern contract graph container assignments that are evaluated based on multi-cloud costs (keeping the user in-the-loop). When a termination criteria is satisfied, an indication of the improved solution may be output.

Some embodiments comprise: means for determining, by a modeling platform, a pattern composition for an integration process associated with a business application; means for transforming, by a cost-aware platform, a decomposed version of the pattern composition, including a plurality of integration pattern contract graphs, into a multi-cloud cost problem optimization representation; means for calculating an initial solution to the cost problem optimization representation using an algorithm (e.g., a modified first fit decreasing bin packing algorithm) to determine a configuration of multi-cloud containers and integration pattern contract graph container assignments; means for iteratively and locally improving the solution by applying feasible transformations to create variant container configurations and integration pattern contract graph container assignments that are evaluated based on multi-cloud costs; and, when a termination criteria is satisfied, means for outputting an indication of the improved solution.

Some technical advantages of some embodiments disclosed herein are improved systems and methods to provide cost-aware application integration in a secure, automatic, and efficient manner.

BRIEF DESCRIPTION OF THE DRAWINGS

FIGS. 21A and 21B illustrate moving an IPCG to another container according to some embodiments.

DETAILED DESCRIPTION

Figure 1:
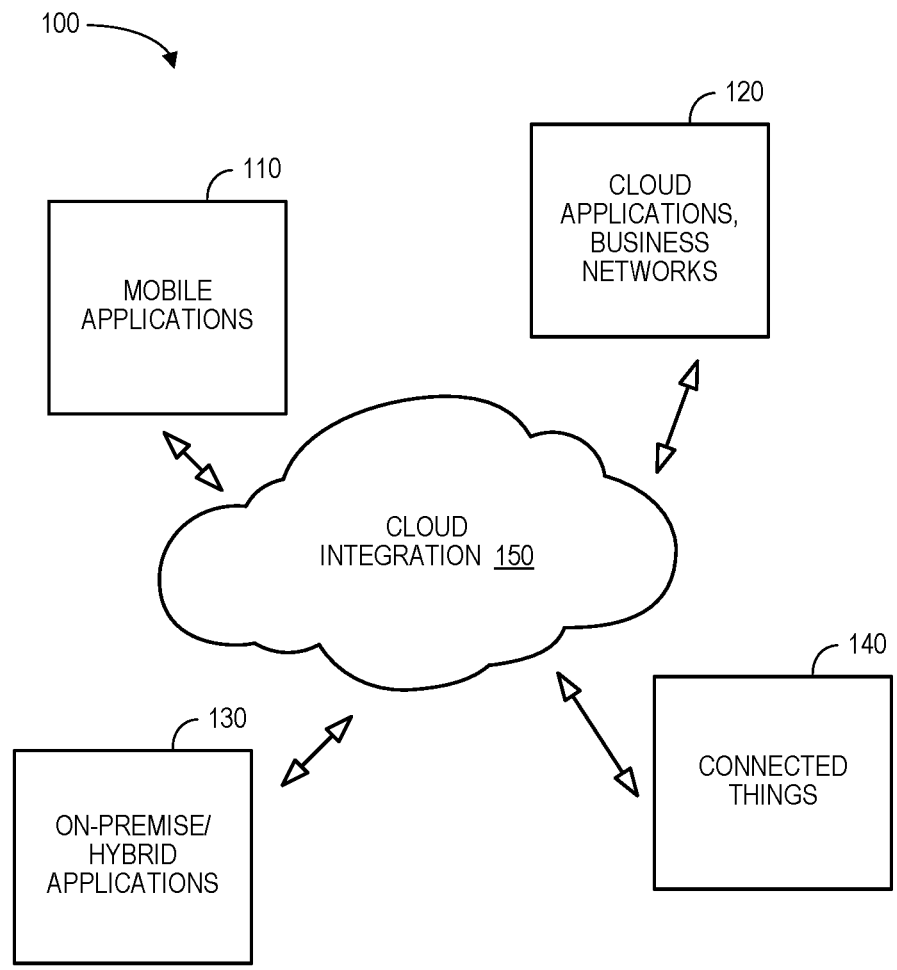
FIG. 1 illustrates a system supported by cloud integration according to some embodiments.

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Recent trends like cloud, mobile, serverless computing result in a growing number of communication partners, as well as more complex integration processes, that have to be operated by INTaaS. The integration processes essentially denote compositions of integration patterns, connecting the different communication endpoints, which are developed by users or customers (referred to as "tenants") and operated by INTaaS vendors. As used herein, the phrase "integration pattern" may refer to, for example, a process, a pattern composition, an Integration Pattern Contract Graph ("IPCG"), etc. While INTaaS vendors strive for cost-optimal, multi-cloud platform deployments (i.e., one process potentially runs across multiple platforms, e.g., AWS, Azure, etc.), the customers or tenants may impose strict security rules (e.g., EU Data Protection Regulation: non-shareable process parts) and/or contractual requirements on these vendors (e.g., prohibiting a particular platform such as "not on AWS"). This can result in goal conflicts between the diverse requirements of the INTaaS customers and the costs of the vendors operating their (private or public) solutions on different cloud platforms.

For example, Table 1 shows three tenants $\{t_1, t_2, t_3\}$, representing customers of an INTaaS, with pattern compositions $\{pc_{t_1,1}, pc_{t_1,2}, pc_{t_1,3}, pc_{t_2,1}, pc_{t_3,1}\}$ that have a security constraint called SH (i.e., shareable: not violating the confidentiality of compositions of other tenants) and have required resource capacities ("CAP"). Shareable integration processes (marked with "SH") are free of side-effects and could be operated in a shared, multi-tenant way. In contrast, the non-shareable processes (marked with "No") can have side-effects, and thus need to be isolated.

TABLE 1

| Pattern Compositions (Per Tenant) | | |
| --- | --- | --- |
| Tenant | CAP | Shareable (SH) |
| $t_1$ | 13 | SH |
|  | 19 | No |
|  | 50 | No |
| $t_2$ | 11 | SH |
| $t_3$ | 21 | SH |

Figure 3:
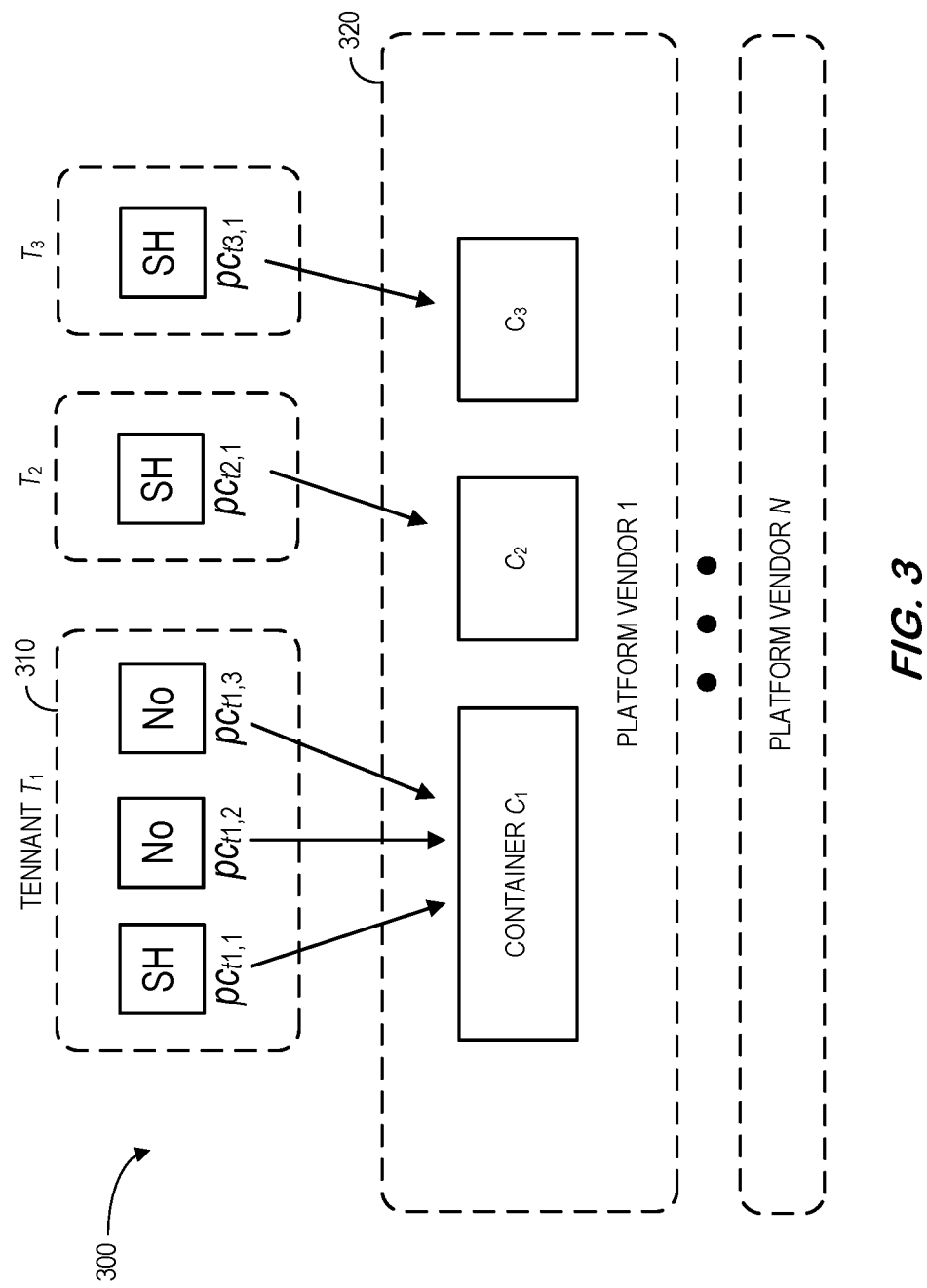
FIG. 3 illustrates a system with tenant-specific hosting according to some embodiments.

A classical hosting approach 300 shown in FIG. 3 supports multiple tenants 310 and leaves the customers' processes on a dedicated, private environment 320 ($c_1, \ldots, c_3$), fulfilling the security requirements, but imposing high costs on the INTaaS vendors (e.g., between 60.00 and 90.00 EUR/month). A security-compliant but cost-efficient alternative (50 EUR/month) would be a placement of pattern compositions $\{pc_{t_1,1}, pc_{t_2,1}, pc_{t_3,1}\}$ to a container $c_1$ of vendor N (not shown) and $\{pc_{t_1,2}, pc_{t_1,3}\}$ to container $c_1$ of vendor 1.

For the problem of cost-efficient placement under constraints and customer preferences from the INTaaS perspective, Cost-Efficient Process Placement ("CEPP") multi-clouds allow for more efficient solutions as compared to classical hosting or single-cloud approaches. Moreover, a multi-cloud placement of shareable subprocesses may be profitable for the INTaaS vendor and reached without neglecting contractual obligations (such as security requirements). In addition, INTaaS customers may have more insight into how process modeling and configuration decisions impact costs. Similarly, a user and/or process modeler may have an interest in controlling the operational costs of the process models (in addition to the complexity of modeling functionally correct process models). For example, many countries (e.g., Italy) follow international standards and use electronic invoicing. In Italy, the administration accepts electronic Business to Business ("B2B") and Business to Government ("B2G") invoices via FatturaPA5, which have to be sent through an interchange system called Sistema di Interscambio ("SdI") that records the data transfer.

Figure 4:
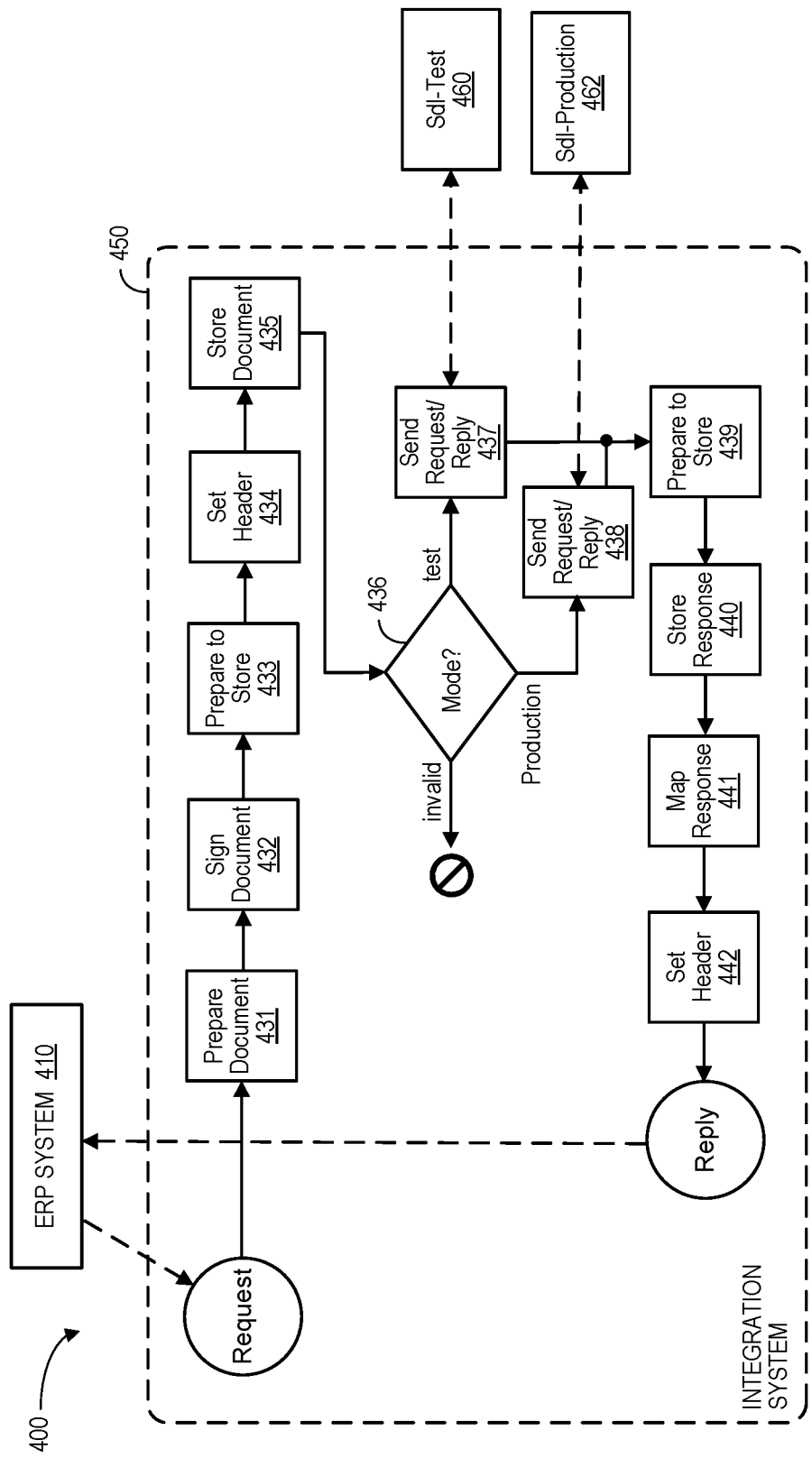
FIG. 4 is a system for Italian invoice processing in accordance with some embodiments.

FIG. 4 shows a simplified version of an Italian invoicing integration process. An Enterprise Resource Planning ("ERP") 410 system sends invoices to an integration system 450, which may prepare the invoice document at 431 by preserving information such as the transfer mode (as well as relevant identifiers like Identity-Code and IdTrasmittente) and then sign the invoice document at 432. An SdI compliant message is prepared at 433 (e.g., field FiscalCode Committente mapped to FiscalCode), and the signed invoice is cached, before it is stored for further reference at 435 after message headers required by SdI are set (e.g., identityCode) at 434. If the mode is invalid at 436, the message is discarded.

If the mode is test at 436, the request/reply are exchanged at 437 with SdI-Test 460. If the mode is production at 436, the request/reply are exchanged at 438 with SdI-Production 462. In either case, the system prepares to store information at 439 and the response message is enriched with information preserved from the original message (e.g., signed invoice), stored for reference at 440 and then at 441 and 442 a compliant response message for the ERP system 410 is prepared (e.g., Signed-Document, DataOraRicezione).

From an INTaaS customer's perspective, leveraging reduced costs of a multi-cloud offering could be beneficial, but note that modeling integration processes such as electronic invoicing poses two important challenges to the user. First, it is essential to model and configure the corresponding process functionally correct, e.g., and thus generate valid invoices and avoid penalties. Second, the INTaaS cost considerations and potentially their solution of the CEPP may not be transparent to the user. Consequently, the user is not aware of functionally correct, but potentially more cost-efficient process model configurations. As a result, the user cannot answer important questions like "Is the process model cost-efficient?", "What is the cost contribution of a dedicated process model?", and "How to make the process more cost-efficient?".

To overcome the challenges of the INTaaS vendor regarding costs and customer preferences (such as security), as well as the limited transparency of the INTaaS customer into the cost reduction potential of their process models, the solution of cost-efficient placement may be combined with the possibility of interaction between the customer and the INTaaS vendor (associated with cost-aware modeling). Therefore, embodiments may adopt a cost-aware modeling process that covers the following objectives: (i) automatic placement decision, (ii) functional correctness-preserving process decomposition, (iii) considering multi-cloud platform vendors, (iv) security constraints, (v) applicability to larger problem sizes (i.e., performance), (vi) and cost improving process change proposals.

Figure 5:
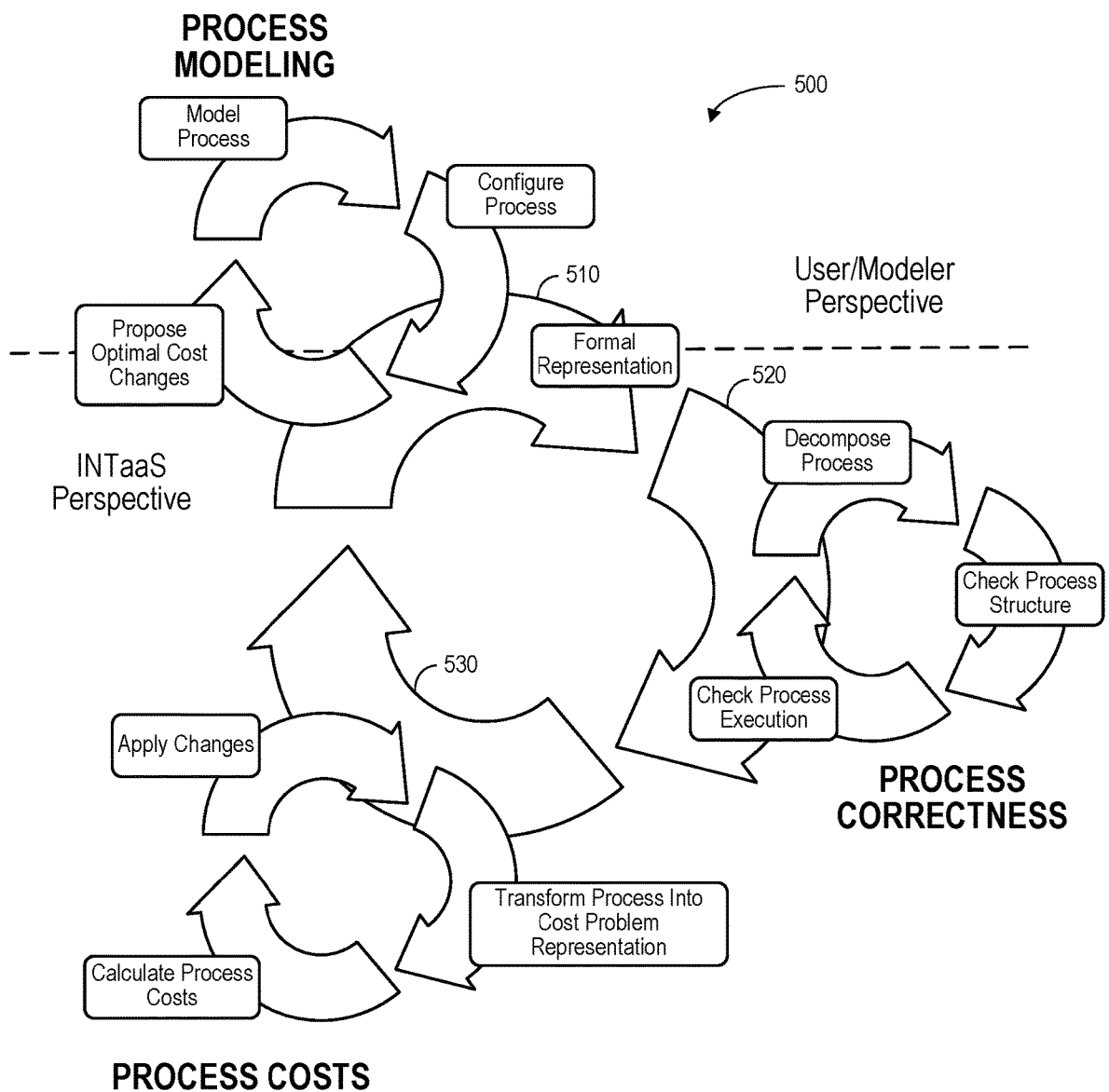
FIG. 5 is an information flow diagram associated with a cost-aware integration modeling process according to some embodiments.

FIG. 5 shows this process 500 with its three main components: process modeling 510, process correctness 520, and process costs 530. The integration process may be modeled and configured in a process modeling 510 tool, from which the model is then translated into a formal representation. With a thorough understanding of the security properties of a process, the formalized process model could be decomposed into smaller, but semantically equivalent process models for a more cost-efficient placement. The resulting (decomposed) formal process model is structurally and semantically analyzed and verified with respect to correctness (i.e., simulation, model checking) by process correctness 520. For structural correctness, the formal representation together with the knowledge about the characteristics of composed patterns is sufficient. For the semantic correctness, a process is analyzed in the context of its dedicated, scenario-specific configuration, a test design, which specifies the desired properties like the expected output of a process simulation, for a given input. Any flaws found during this step may result in another round of modeling or configuration adjustment.

The correct integration process model is transformed by the process costs 530 component into a cost problem representation, from which its costs for an INTaaS can be calculated optimally or through application of dedicated heuristics in an existing multi-cloud setup. This may require additional information (e.g., about all currently operated processes by the INTaaS for all customers) as well as their required resources and the platform as a Service ("PaaS") vendor container costs and capacities. These costs can be broken down to a customer, to find a more cost-efficient process model, and lower cost process models can be proposed to the user as process improvements. The process costs 530 may also be associated with "user-in-the-loop" cost control during the process modeling 510 and process correctness 520.

Figure 6:
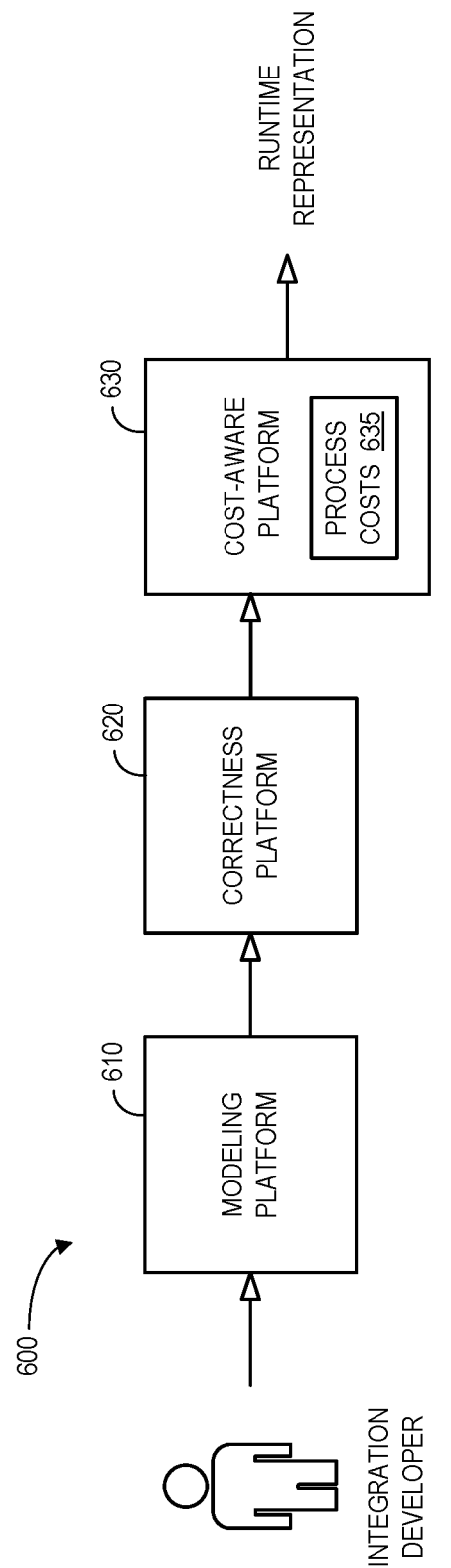
FIG. 6 is a high-level block diagram of a system in accordance with some embodiments.

FIG. 6 is a high-level block diagram of a system 600 in accordance with some embodiments. The system 600 includes a modeling platform 610 that might interact with an integration developer. The modeling platform 610 may provide an output to a correctness platform 620, which, in turn, provides an output to a cost-aware platform 630 to create a runtime representation. In some embodiments, the cost-aware platform 630 includes a process costs engine 635. The process costs engine 635 may, for example, facilitate cost-aware placement of processes in a multi-cloud environment for INTaaS problem sizes while respecting configurable security constraints. This may, in some embodiments, be performed automatically or be initiated via a command from a remote operator interface device. As used herein, the term "automatically" may refer to, for example, actions that can be performed with little or no human intervention. Note that the modeling platform 610, correctness platform 620, and/or cost-aware platform 630 may be associated with one or more libraries, a cloud or on-premise operating environment, software engines and similar components to execute various functions, etc. These computing digital platform mas be associated with an environment in which any of the software described herein is executed and may include hardware elements, an operating system, a web browser and associated API, other software, etc.

As used herein, devices, including those associated with the system 600 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The platforms 610, 620, 630, including those associated with the system 600 and any other device described herein, may store information into and/or retrieve information from various data stores (e.g., a data storage device), which may be locally stored or reside remote from the platforms 610, 620, 630. Although a single modeling platform 610, correctness platform 620, and cost-aware platform 630 are shown in FIG. 6, any number of such devices may be included in the system 600. Moreover, various devices described herein might be combined according to embodiments of the present invention. For example, in some embodiments, the modeling platform 610, correctness platform 620, and/or cost-aware platform 630 might comprise a single apparatus. The system 600 functions may be performed by a constellation of networked apparatuses, such as in a distributed processing or cloud-based architecture.

An operator or administrator may access the system 600 via a remote device (e.g., a Personal Computer ("PC"), tablet, or smartphone) to view information about and/or manage operational information in accordance with any of the embodiments described herein. In some cases, an interactive graphical user interface display may let an operator or administrator define and/or adjust certain parameters (e.g., to define how cost-aware optimization rules are applied), provide and/or receive automatically generated recommendations or results from the system 600, etc.

Figure 7:
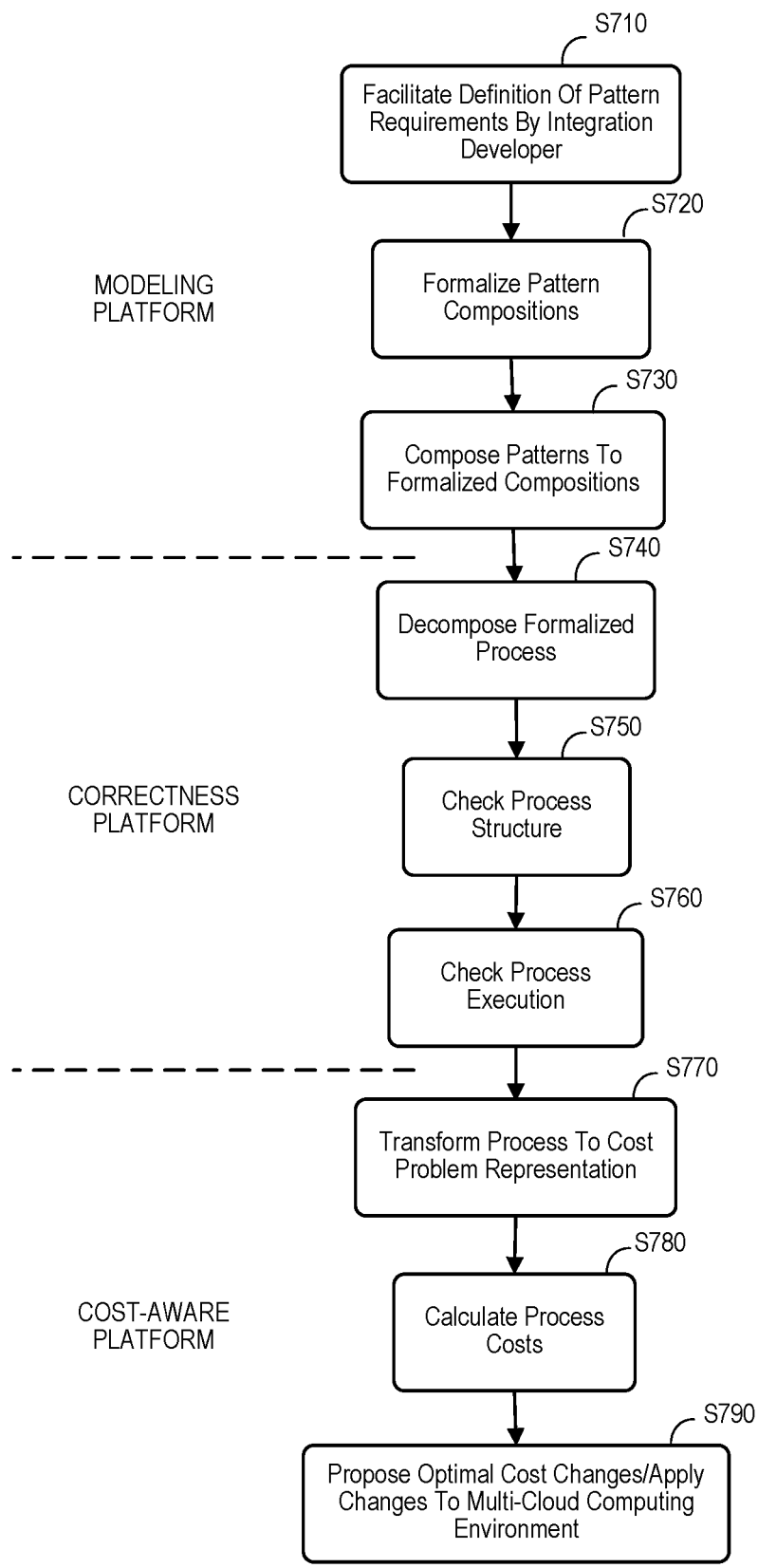
FIG. 7 is a method according to some embodiments.

FIG. 7 is a method that can be performed by some or all of the elements of the system 600 described with respect to FIG. 6. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S710, a computer processor of a modeling platform may facilitate definition of pattern requirements by an integration developer. At S720, the modeling platform may formalize pattern compositions. At S730, the modeling platform may compose patterns formalized compositions. At S740, a correctness platform may decompose formalized processes and check for structural correctness at S750. At S760, the correctness platform may execute a semantic transformation or binding to pattern characteristics and associated interactions and/or check process execution. Any required corrections may be made at this point. At S770, a cost-aware platform may transform the process into a cost problem representation. At S780, process costs may be calculated and/or the system may propose optimal cost changes before applying the changes to a multi-cloud computing environment at S790.

Note that existing approaches do not fully support cost-efficient placement, while allowing for a cost-aware modeling, and hence the following questions are formulated to guide the design and development of a cost-aware modeling process meeting objectives (i) through (vi):

Q1 What are the minimal costs for an INTaaSvendor? When is a multi-cloud deployment beneficial (e.g., for a vendor)? (objectives (iii)—(iv))

Q2 How to practically determine a cost-efficient placement? (objectives (i), (v))

Q3 How to decompose processes, while preserving their correctness? (objective (ii))

Q4 Which mechanisms help users to cost-efficiently model integration processes? (objective (vi))

An optimal solution of CEPP may be formalized as a mixed-integer linear program (Q1) and a local search heuristic based on hill-climbing may make the solution practically applicable for real-world problem sizes (Q2). Evaluation shows that a multi-cloud placement and a decomposition of integration processes into smaller sub-processes are mostly beneficial for an INTaaS vendor in terms of cost-savings (Q3). Embodiments may add a correctness-preserving formal definition of process decompositions (i.e., the process remains functionally correct after decomposition) and cost-efficient process improvements may be provided (Q3, Q4). The specification of correctness-preserving integration process decompositions and process improvements is based on IPCGs. A combination of a practically tractable solution of CEPP (including process decomposition) and cost-reducing process improvements may enable the study of cost-aware process modeling (Q4).

An extensible modeling framework for CEPP may include constraints and comprise a benchmark for heuristic solutions. A local search heuristic with a novel adaptation of bin-backing to CEPP may find an initial solution, and four CEPP transformations: move, shrink, reduce, and swap may make the evaluation tractable.

A main security requirement is associated with shareability (e.g., shareable or non-shareable patterns and compositions) which denotes side-effects to another tenant. Integration patterns may be defined as free of side-effects from a security point of view (i.e., shareable), if they do not allow for User Defined Functions ("UDFs"), other than the conditions and expressions offered by the INTaaS vendors, and do not access shared resources (e.g., databases). The UDFs are critical in this regard if they allow for non-side-effect free programs on a shared container. Assume that a pattern composition is shareable if all its patterns are free of side-effects. Note that shareability may depend on the specific implementation of the pattern by the INTaaS vendor (e.g., side-effect free transformation language vs. UDF).

When classifying the 166 integration patterns from catalogs by a manual analysis of the pattern descriptions, there are 31 patterns that are potentially non-shareable (e.g., script, re-sequencer). The specific implementations of the patterns reduce these to two (e.g., script and message mapping), which are used in 48.59% and 63.32% of the compositions for scripts and mappings, respectively. The small number of patterns with side-effects is not surprising, since INTaaS vendors try to avoid them, but the high usage rate emphasizes their relevance for this provider (thus making CEPP solutions desirable).

For the cost-aware modeling process 500 in FIG. 5, consider automated changes and improvements as crucial. After calculating the process costs, the steps "Apply changes" and "Propose optimal cost changes" may be relevant for the interaction with the modeler. If the latter accepts the change proposals showing their cost reduction potentials, he or she can continue with the changed process model, conduct custom changes, and/or get new change proposals (or keep the current process model).

One may systematically collect and characterize optimizations applicable to integration pattern compositions. The optimizations are set into the context of their cost reduction potential in Table 2 and two optimizations are added (i.e., Combine neighbors and Routing to routing slip) which are adapted from the literature of related domains (briefly described herein).

TABLE 2

Optimization Strategies in Context of Cost Reduction Potential

| Strategy | Optimization | Cost Reduction? |
|---|---|---|
| OS-1: Process Simplification | Redundant Sub-process Removal | Yes |
| | Combine Sibling Patterns | Yes |

TABLE 2-continued

Optimization Strategies in Context of Cost Reduction Potential

| Strategy | Optimization | Cost Reduction? |
|---|---|---|
| | Unnecessary Conditional Fork | Yes |
| | Combine Neighbors | Yes |
| | Routing to Routing Slip | Yes |
| OS2: Data | Early-Filter | Yes |
| Reduction | Early-Mapping | Slight |
| | Early-Aggregation | Slight |
| | Claim Check | Yes |
| | Early Split | No |
| OS:3: | Sequence to Parallel | No |
| Parallelization | Merge Parallel Sub-processes | Yes |

The combination of neighbor patterns can also be found in the data integration and scientific workflow domains as operator merge. However, here the operators are essentially the integration patterns, and a merge is only allowed, if the neighbor patterns are of the same type (e.g., subsequent message translator or content enricher patterns) and have no conflicts accessing the message. Moreover, the simplification of a content-based router to a routing slip pattern is remotely related to Unnecessary Switch-Path and Eliminate-Unused-Partner. While the intent seems similar, the routing slip maintains routing configurations for all switch-paths of directly connected endpoints (and thus transforms process model elements into configurations).

Both new optimizations can be classified as OS-1: Process Simplification, which groups together all techniques whose main goal is reducing model complexity (e.g., number of patterns). The cost reduction of these techniques can be measured by the reduced number of pattern instances in a runtime system that leads to a lower resource consumption (e.g., main memory, CPU utilization, etc.) which is a major cost-driver in current cloud platforms.

Another way of reducing the amount of required memory is OS-2: Data Reduction. If data is filtered before it reaches or early in the integration process (Early filter) or is stored on disk and picked up at the end of the process (Claim check), then the process could be placed on a smaller, cheaper container variant. Notably, the effects of the other OS-2 optimizations are less (e.g., Early-Mapping) or even require more memory (e.g., Early-Split consumes more memory for newly created messages while not reducing the overall amount of payload data).

Finally, OS-3: "Parallelization" increases the costs through redundancy (e.g., Sequence to Parallel), and optimizations such as Merge parallel sub-processes merely invert cost inefficient parallelizations.

In summary, especially process simplification and data reduction strategies (i.e., OS-1, OS-2) seem to have a cost reduction potential. The newly introduced combine neighbors and routing to routing slip optimizations are defined later herein.

Recall that IPCGs denote a formal integration pattern composition model and may be extended with a shareability requirement and resource constraints. IPCGs may provide comprehensive coverage of integration pattern compositions and inherent structural correctness verification properties addressing objective (ii). While IPCGs can only be used to formally assess the structural correctness of pattern compositions (as well as their changes like improvements/optimizations), they can be lifted to timed DB-net, a formalism based on Colored Petri Nets, allowing for a formal assessment of their semantic correctness.

An IPCG is a connected, directed acyclic graph whose nodes denote integration patterns (P) and edges stand for message channels (E). Moreover, Integration Pattern Typed Graph ("IPTG") is a directed graph with set of nodes P and set of edges E⊆P×P, together with a function type: P→T, where T={start, end, message processor, fork, structural join, condition, merge, external call}. An IPTG (P, E, type) is correct if:

∃$p_1$, $p_2$∈P with type($p_1$)=start and type($p_2$)=end;

if type(p)∈{fork, condition} then |•p|=1 and |p•|=n, and if type(p)=join then |•p|=n and |p•|=1;

if type(p)∈{message processor, merge} then |•p|=1 and |p•|=1;

if type(p)∈{external call} then |•p|=1 and |p•|=2; and

The graph (P, E) is connected and acyclic.

The nodes are typed by pattern types with characteristics char (e.g., channel and message cardinalities) as well as (cross-) pattern data composition represented by inbound and outbound pattern contracts (i.e., inContr and outContr).

This results in the IPCG being a tuple:

$$(P, E, type, char, inContr, outContr)$$

where (P, E, type) is an IPTG, char: P→$2^{PC}$ is a pattern characteristic assignment, and inContr, outContr: P→$2^{CPT}$×$2^{EL}$ are pattern contract assignments, called the inbound and outbound contract assignment respectively. It is structurally correct, if the underlying IPTG (P, E, type) is correct, and inbound contracts match the outbound contracts of the patterns' predecessors, i.e. if for every p∈P $$p=start \lor match(inContr(p), \{outContr(p') | p' \in •p\})$$

Briefly, the set CPT in a contract represents integration concepts (e.g., message is encrypted: {(ENCR, no)}), while the set EL represents data elements and the structure of the message (e.g., its headers ({HDR, H}), its payload ({PL}, Y). Two IPCGs are isomorphic if there is a bijective function between their patterns that preserves edges, types, characteristics, and contracts. The syntactic correctness of an IPCG follows from a structural match function over the contracts for correctness-preserving re-writing of the graphs.

Figure 8:
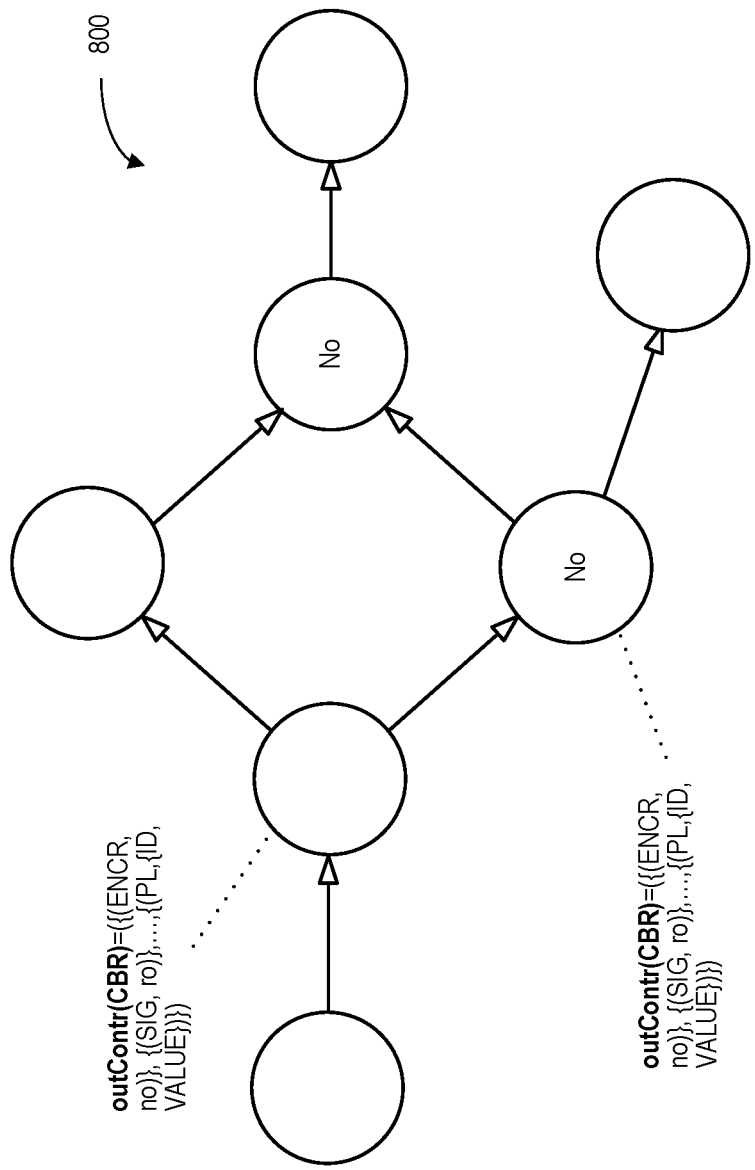
FIG. 8 is a sample integration pattern contract graph in accordance with some embodiments.

FIG. 8 shows an IPCG 800 with two contracts (neglecting the other contracts for better readability), the outbound contract outContr of the shareable content-based router pattern ○, and the subsequent inbound contract inContr of the non-shareable multicast pattern (○ labeled "No"). The contracts depict properties indicating that messages passed from the router are neither encrypted nor signed and have a payload PL of ID and VALUE data elements. The inbound contract of the multicast has a fitting inbound contract (which accepts only messages with unencrypted payload and the same data elements) and can handle signed or unsigned messages. In other words, the contracts match, and thus this part of the composition is structurally correct.

The shareability requirement and resource constraints (as capacity) can be considered as additional pattern characteristics of the set of pattern characteristics of each pattern, formally defined as a pattern characteristic assignment for an IPTG (P, E, type) is a function char: P→$2^{PC}$, assigning to each pattern a subset of the set:

$$PC=(\{MC\} \times \mathbb{B} \times \mathbb{B}) \cup (\{CHG\} \times \{ro,rw\}) \cup (\{MG\} \times \mathbb{B}) \cup (\{CND\} \times 2^{BExp}) \cup (\{CAP\} \times \mathbb{B}) \cup (\{SH\} \times \mathbb{B}),$$

where CAP is the set of numeric resource requirements, $\mathbb{B}$ is the set of Booleans, BExp is the set of Boolean expressions, BExp is the set of Boolean expressions, and the message cardinality MC (number of incoming and outgoing messages), the access CHG (with read-only ro and readwrite rw), message-generating MG (pattern forwards original or newly generated message), and condition CND (Boolean function, e.g., for routing, correlation) some distinct symbols. The capacity CAP is a positive numeric value, indicating an amount of resources required by the pattern during runtime. The shareability indicator SH denotes whether the pattern has security relevant side-effects.

A Boolean characteristic may be added that denotes whether the pattern is shareable or not (SH) and its required capacity (CAP) to already existing characteristics. According to some embodiments, CAP is set automatically with runtime data (e.g., used main memory, CPU).

Figure 9:
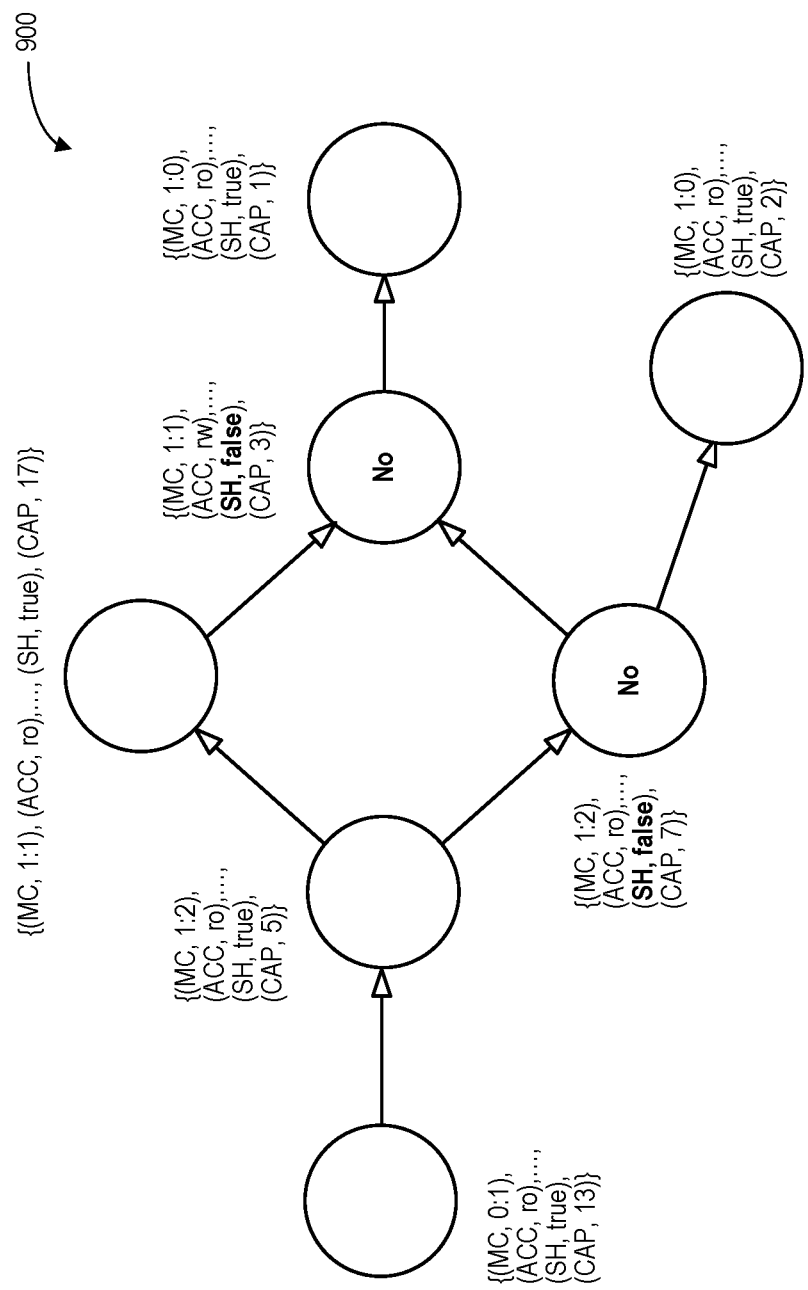
FIG. 9 is a sample integration pattern type graph according to some embodiments.

FIG. 9 denotes an IPTG 900 (with characteristics, no contracts) that is essentially a composition of single patterns (i.e., nodes) connected by message channels (i.e., edges). The nodes have characteristics like message cardinality MC and content change CHG among others as well as the new shareability SH and required capacity CAP characteristics. Briefly, the composition starts with a pattern that creates a message (thus message cardinality of 0:1) and forwards it to a read-only routing pattern with two outgoing message channels. Thereby, one of the successor patterns is shareable, while the other is assumed to have side-effects. Similarly, the join router implementation in this example has side effects, which is usually not the case. The receiving patterns both have a 1:0 cardinality. The capacities denote resources required for these patterns during runtime (e.g., main memory and/or RAM).

The structural representation of an IPCG is close to the process models a user usually works with and subsequently serves as a basis to define a CEPP multi-cloud model (as well as for decomposition and optimization definitions).

The term "multi-cloud" may refer to applications distributed over multiple cloud platforms. Further, vendors of these platforms are PaaS providers who offer computing environments $\omega_j$, called containers j, with different capacities $B_j$ and prices as container costs $G_j$ that can be summarized to the tuple (j, $\omega_j$, $B_j$, $G_j$) allowing for the identification of variants across vendors. The pattern compositions i, $T_i$, $A_i$, $z_{ikj}$ denote integration content i developed by the customer or tenant $T_i$ with a required capacity $A_i$ and a shareability property $z_{ikj}$ (i.e., side-effects of composition k in the same container j as composition i) in an INTaaS vendor specific integration Domain-Specific Language ("DSL"). The required capacity of a composition $A_i$ denotes the sum of the capacities of all patterns in i.

Figure 10:
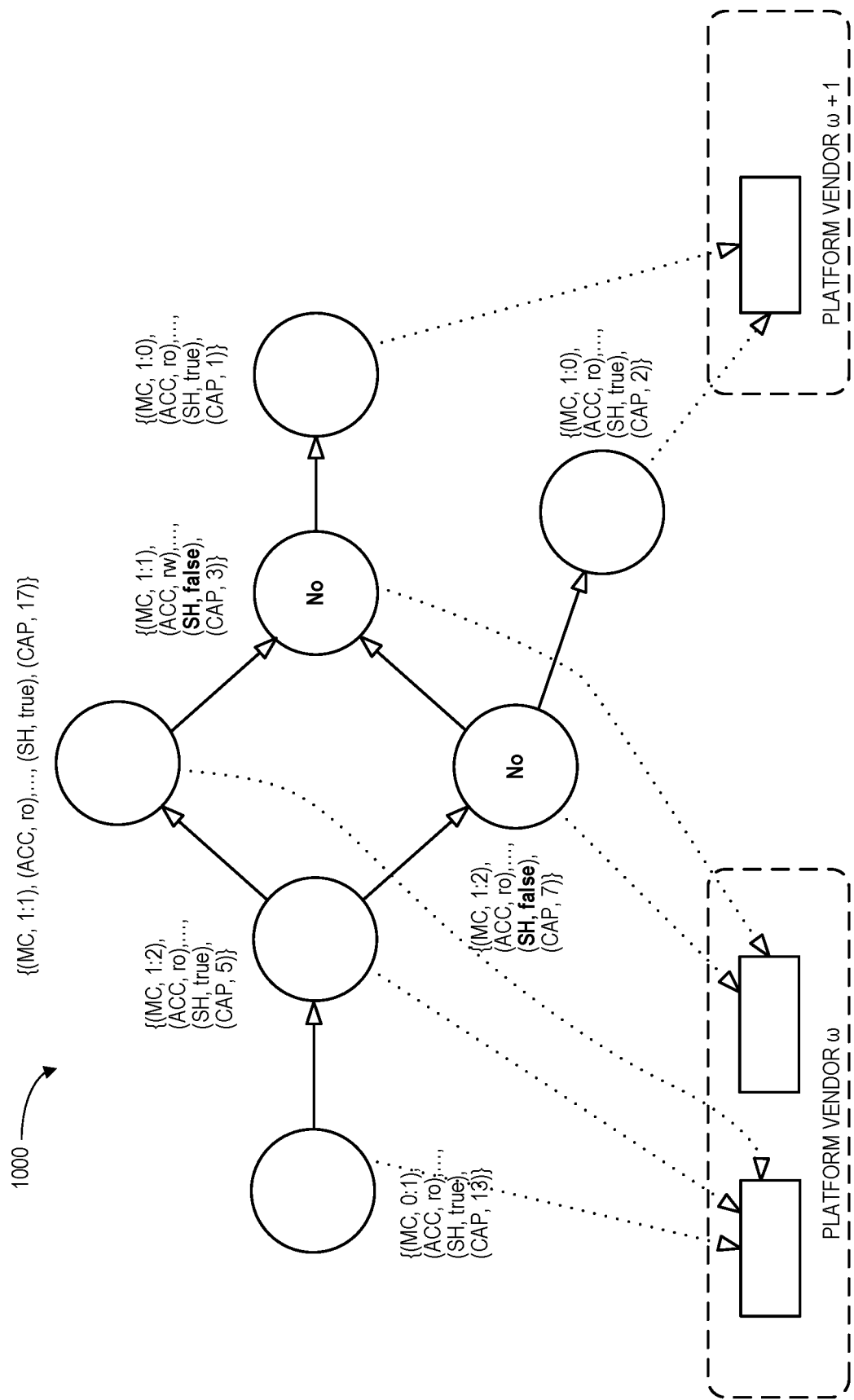
FIG. 10 shows placement of pattern compositions on platform variants in accordance with some embodiments.

FIG. 10 shows 1000 the different conceptual entities set into context by example of the IPTG 900 from FIG. 9 for a given set of platforms from vendors $\omega$ and $\omega+1$. The example assumes that the process can be decomposed across the two cloud vendors and that the decomposition makes sense from a cost perspective. Consequently, both configurations of platform vendor take some of the pattern sub-compositions (per the dashed arrows). Vendor $\omega$ runs the non-shareable composition parts isolated to fulfill the no information sharing constraint. The non-dashed lines denote message exchange, whose latency increases with a security-aware decomposition (e.g., across multiple platform vendors).

A multi-cloud placement of processes may be beneficial for an INTaaS vendor and a decomposition could lead to an even more cost-efficient placement. Generally, a decomposition of an IPCG may lead to multiple dependent IPCGs (calling each other). The decomposition or cutting of a problem into smaller problem sizes is a powerful model-based improvement or optimization technique. Similar to "component decomposition," integration processes may be decomposed into smaller sub-processes and then a solution for the CEPP of the sub-processes may be calculated. This increases their number but leads to smaller compositions that might be placed more cost-efficiently. However, the decomposition of a process must not impact the correctness of its combined sub-processes. For that, a rule-based graph rewriting system may give giving a formal framework in which different changes can be compared.

Figure 11:
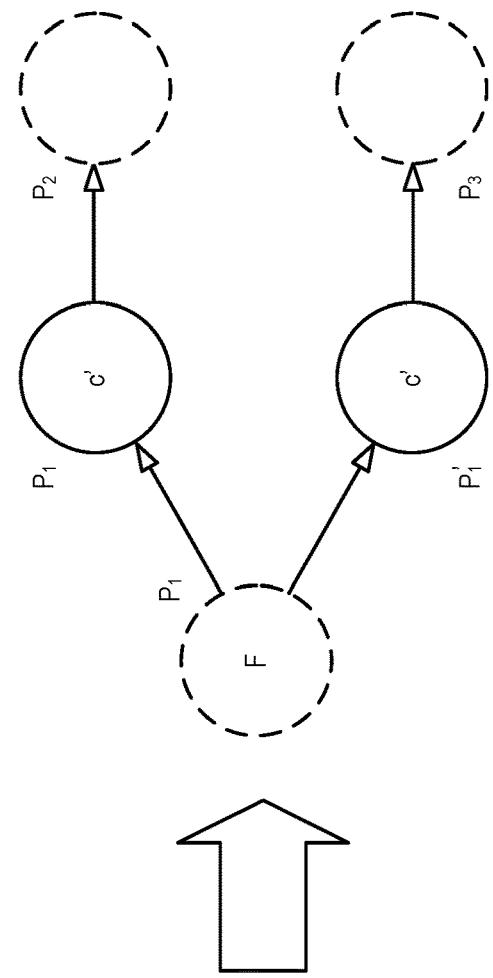
FIG. 11 is an example of graph rewriting according to some embodiments.
Figure 11:
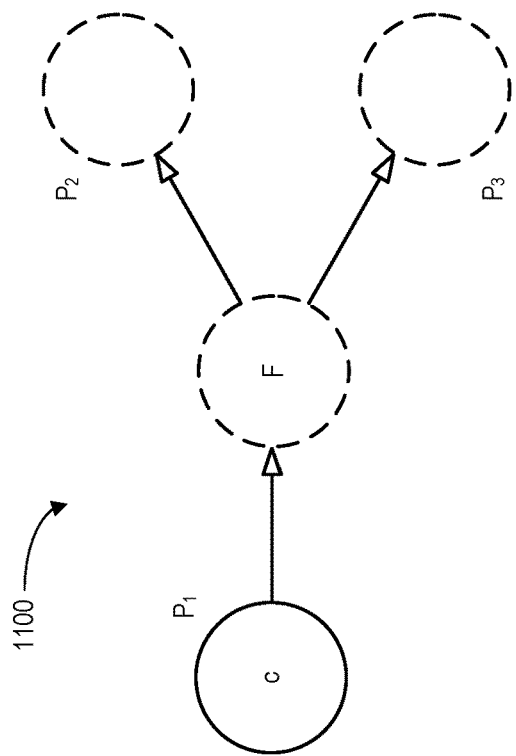

Graph rewriting provides a visual framework for transforming graphs in a rule-based fashion. A graph rewriting rule is given by two embeddings of graphs $L \hookleftarrow K \hookrightarrow R$, where L represents the left-hand side of the rewrite rule, R the right-hand side, and K their intersection (the parts of the graph that should be preserved by the rule). A rewrite rule can be applied to a graph G after a match of L in G has been given as an embedding $L \hookrightarrow G$; this replaces the match of L in G by R. The application of a rule is potentially non-deterministic: several distinct matches can be possible. Visually, a rewrite rule may be represented by a left-hand side and a right-hand side graph with dashed portions and solid portions: dashed parts are shared and represent K, while the solid parts are to be deleted in the left-hand side, and inserted in the right-hand side, respectively. For instance, FIG. 11 shows rewrite rules 1100 that move the node $P_1$ past a fork by making a copy in each branch, changing its label from c to c' in the process.

Formally, the rewritten graph may be constructed using a Double-Pushout ("DPO") from category theory. DPO rewritings might be used, for example, because rule applications are side-effect free (e.g., no "dangling" edges) and local (i.e., all graph changes are described by the rules). Additionally, a relabeling DPO extension may be used to facilitate the relabeling of nodes in partially labeled graphs. In FIGS. 8 and 9, contracts and characteristics were shown as comments, but in the rules that follow they will be represented as (schematic) labels inside nodes for space reasons.

Figure 12:
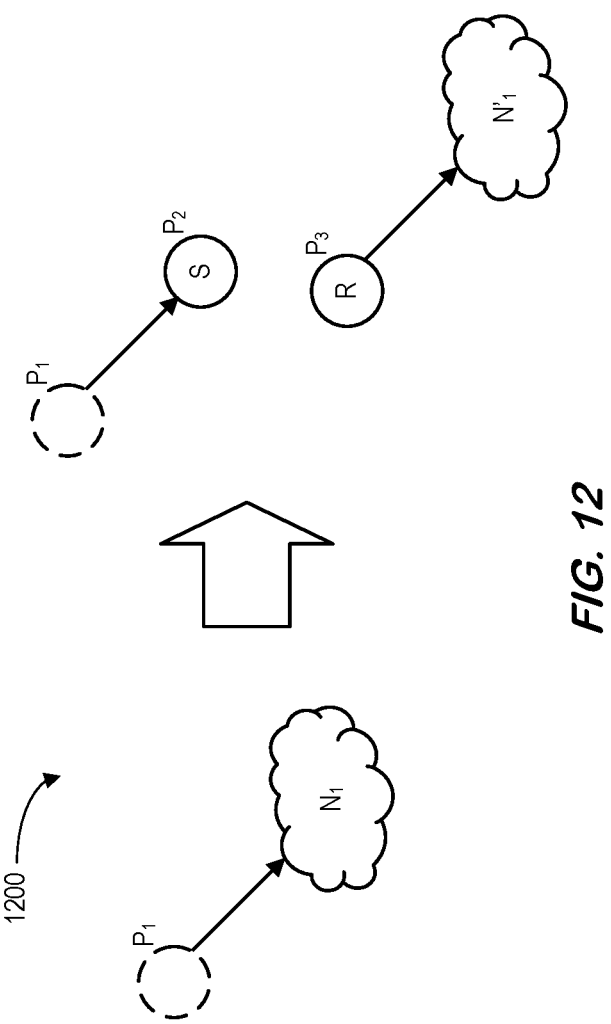
FIG. 12 shows shareable pattern to non-shareable rewriting in accordance with some embodiments.

In addition, also consider rewrite rules parameterized by graphs, where a parameter graph may be drawn as a cloud (see e.g., FIG. 12 for an example). A cloud represents any graph, sometimes with some side-conditions that are stated together with the rule. When looking for a match in a given graph G, it is of course sufficient to instantiate clouds with subgraphs of G—in this way, one can reduce the infinite number of rules that a parameterized rewrite rule represents to a finite number. Parameterized rewrite rules can formally be represented using substitution of hypergraphs or by !-boxes in open graphs. Since optimization strategies are described as graph rewrite rules, one can be flexible with when and/or in what order the strategies are applied. For example, the rules may be applied repeatedly until a fixed point is reached, i.e., when no further changes are possible, making the process idempotent. Each rule application preserves IPCG correctness because input contracts do not get more specific, and output contracts remain the same. Methodologically, the rules are specified by preconditions, change primitives, post-conditions and an optimization effect, where the pre- and post-conditions are implicit in the applicability and result of the rewriting rule.

For the decomposition of integration processes into shareable and non-shareable parts, transitions may be from a shareable pattern to a connected subgraph of non-shareable patterns, and vice versa. In a shareable to non-sharable transition, the transition from sharable pattern to a subgraph of non-shareable patterns adds a remote call to the shareable part and a receiving endpoint to the non-shareable part. For the transformation to be correct, the original IPCG is split into two IPCGs, connected by a remote call configuration. The rewriting is depicted by the rule 1200 in FIG. 12. The left-hand side of the rule detects a shareable pattern $P_1$ that is connected to one non-shareable pattern that themselves might be connected to several non-shareable patterns without a shareable one in-between. In the right-hand side of the rule, the direct call from $P_1$ to one pattern in $N'_1$ is replaced by an external call pattern $P_2$ connected to $P_1$ that forwards the message to a newly added event-based receiver endpoint pattern $P_3$ that forwards the message to the respective pattern in $N'_1$. The change is especially beneficial for cases in which the size of the non-shareable subgraph $N'_1$ is greater than the sum of added external call and event-based receiver patterns, or if the resulting sub-graphs have a more cost-optimal fit in the respective CEPP problem.

Similarly, the transition from a subgraph of non-shareable patterns to a shareable pattern splits the original IPCG into two IPCGs connected via implicit remote communication.

Figure 13:
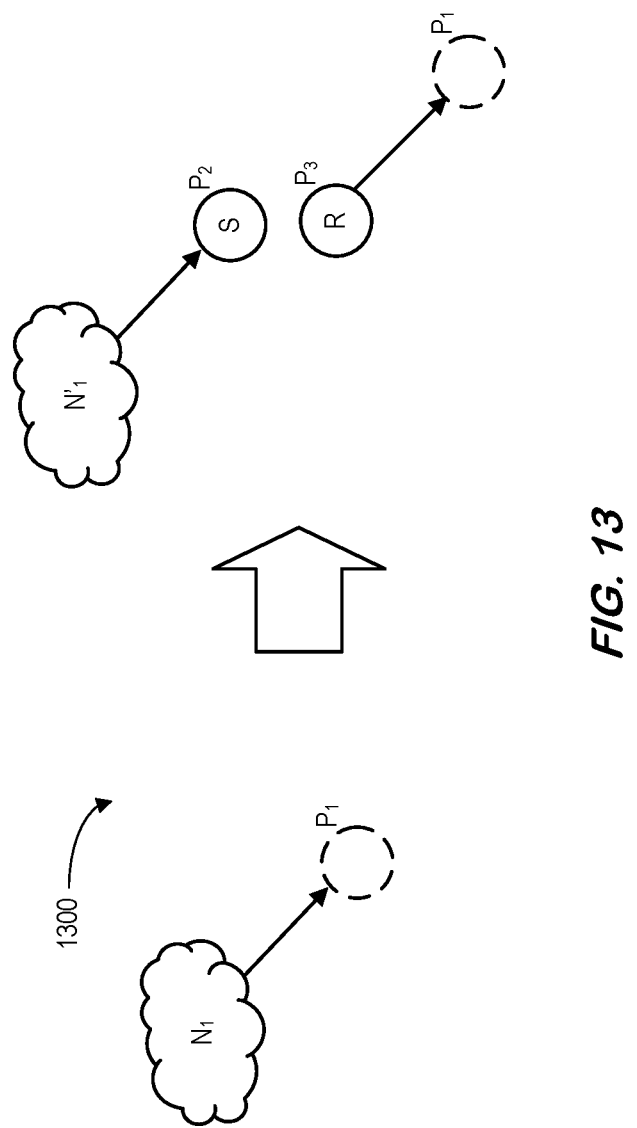
FIG. 13 shows non-shareable to shareable pattern rewriting according to some embodiments.

In the rewriting rule 1300 depicted in FIG. 13, the left-hand side matches any configuration with a transition from one non-shareable pattern (potentially connected to other non-shareable patterns) $N_1$ to a shareable pattern $P_1$. The right-hand side of the rule shows the replacement of the direct call between the patterns by an external call $P_2$ that connects the non-shareable subgraph N with the shareable $P_1$ via the receiver $P_3$. The effect is the same as for the shareable to non-shareable transition.

Figure 14:
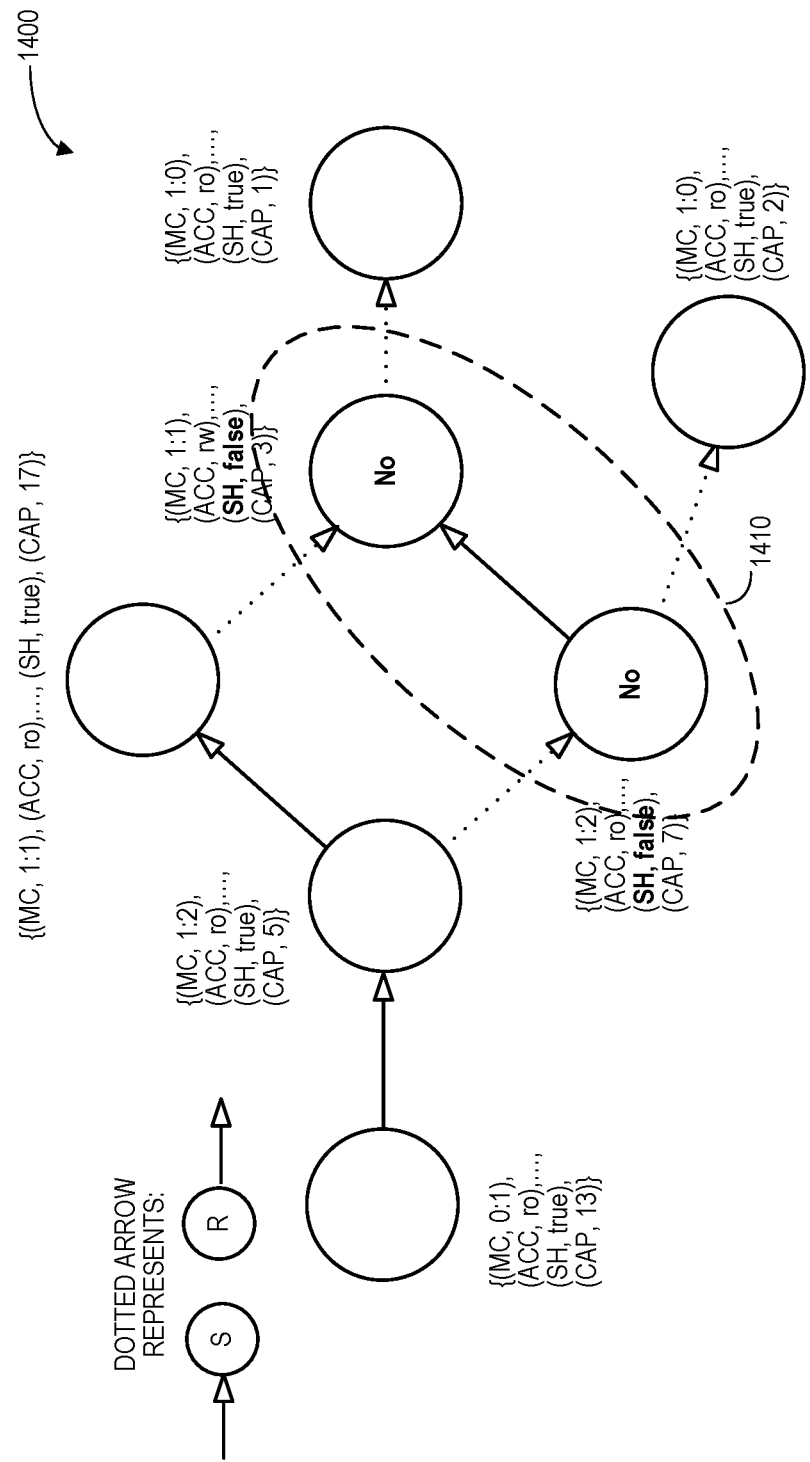
FIG. 14 illustrates decomposition of a pattern composition in accordance with some embodiments.

When iteratively applying the two previously defined rules 1200, 1300 to the IPCG 1000 in FIG. 10, the IPCG will be decomposed 1400 as shown in FIG. 14. The first rule matches the transition from the conditional fork to the first non-shareable pattern, by adding a remote communication (shown as a dashed arrow). Similarly, the second shareable to non-shareable transition will be disconnected, leaving a shareable IPCG with three of the original patterns and two external call patterns, connected to them. No further rules match on that IPCG. The resulting second IPCG with two connected non-shareable patterns 14010 has two matches of the non-shareable to shareable rule, eventually leading to two additional, shareable IPCGs with one pattern each. In total, there are three shareable and one non-shareable IPCG left for cost calculation.

Table 2 listed known optimization strategies, added two new optimizations, and assigned their cost reduction potential. Since the new optimizations (i.e., combined neighbors and reduce router to routing slip) have not been formally defined, they may be specified as graph rewritings. Consequently, they can then be used together with the already existing optimizations.

Two patterns are considered neighbors if they are sequentially connected to each other in an IPCG. Neighbors can be combined into one pattern if their configurations on an EL data element level are non-conflicting, non-dependent (e.g., one pattern deletes a data element that another one tries to read), or their operations can be executed by the same pattern instance in the order of their appearance in the IPCG. Hence, combining two or more neighbor patterns requires that they are all of the same pattern type (e.g., content enricher). Two message transformation patterns relevant to this (i.e., content enricher and message translator) could be automatically combined.

Figure 15:
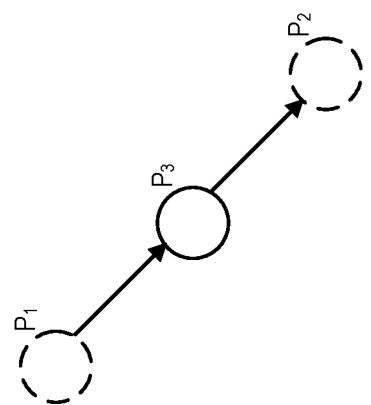
FIG. 15 shows combine pattern rewriting according to some embodiments.
Figure 15:
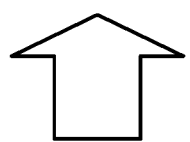
Figure 15:
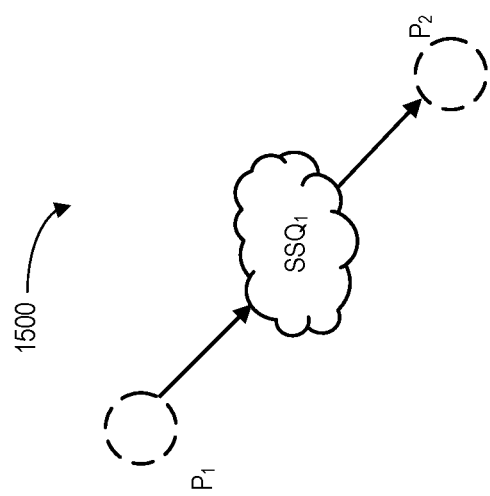

The combine pattern rule 1500 is given in FIG. 15, where sub-sequence $SSQ_1$ denotes a sequence of non-conflicting neighbor patterns of the same type that are combined to one pattern $P_3$ of that type. The model complexity is reduced by translating the explicitly modeled sequence of patterns to implicit configurations in just one pattern (e.g.,)(Path). Assuming that each pattern instance allocates redundant resources (e.g., memory), the static resource consumption of this IPCG is reduced by the number of patterns in $SSQ_1$ minus the new pattern $P_3$. Additional cost reduction potential lies in merging resource artifacts like files (e.g., XSD, WSDL) to just one instance each.

If a content-based router is directly connected to one or many external call patterns having the same inbound contract (i.e., usually different endpoints of one type of receiver system), then the router and all external call patterns can be replaced by a content enricher pattern, which configures the recipient according to the conditions of the router, followed by just one external call pattern that takes the configuration into account and forwards the respective receiver. The router to router slip pattern rule 1600 is given in FIG. 16, where $P_1$ is a content-based router with n−1 conditional branches to external call patterns $\{P_2, \ldots, P_n\}$ to the same receiver R. On the right-hand side of the rule, a content enricher $P_1$ is added instead of the router $P_1$ and configured to add a routing slip to incoming messages according to the conditions from $P_1$. Subsequently, only one external call pattern $P_2$ is required, which checks the routing slips in the message to forward to the correct receiver in R. The effect is similar to the combine patterns rewriting. That is, the model complexity is reduced, and thus shrinking the required pattern instances to two, instead of n+1 patterns in the explicit routing case.

The correctness of the introduced process changes (i.e., process remains functionally correct after changes have been applied), represented by graph rewriting rules, is crucial for the cost-aware modeling process. With the representation of integration processes as IPCGs embodiments may ensure that they are structurally correct by definition. However, do the IPCGs remain structurally correct after applying the introduced rewritings rules? The correctness properties of each graph rewriting will be addressed individually based on the definition of matching contracts in IPCGs.

Lemma 1. The rewritings described herein may correct pattern compositions if their pattern contracts match and if all newly created graphs remain reachable. In each step, the rewriting modifies certain nodes. It may be enough to show that the affected parts of the interpretation of the graphs retain matching pattern contracts and all decomposed parts remain reachable as in the original graph, which can be shown for each rewriting.

For shareable to non-shareable transitions, the right-hand side of the rule 1200 in FIG. 12 introduces a remote call pattern S connected to $P_1$ and an event-based receiver pattern R connected to a pattern in $N_1$. The composition is correct, if the inbound pattern contract inContr(S) of the introduced external call pattern S accepts any outContr($P_1$) of $P_1$:

inContr(S)=((ENCR,any),(SIG,any), . . . ,(PL,any)), outContr(S)=((ENCR,any),(SIG,any), . . . ,(PL,any)), and its outbound contract outContr(S) passes any input onward without introducing further restrictions in the contract. Further, the inbound pattern contract inContr(R) of the receiver pattern T accepts any outContr(S) of $P_2$:

inContr(R)=((ENCR,any),(SIG,any), . . . ,(PL,any)), outContr(R)=((ENCR,any),(SIG,any), . . . ,(PL,any)), and the event-based receiver's outbound contract outContr (R) passes any input onward without introducing further restrictions in the contract for a given inbound contract inContr (NO with:

inContr($N'_1$)=((ENCR,$X$),(SIG,$Y$), . . . ,(PL,$Z$)), outContr($P_1$)=((ENCR,$X$),(SIG,$Y$), . . . ,(PL,$Z$)), as well as outContr($P_1$) matches inContr(N1). Finally, the remote call configuration of the external call point to the event based receiver, making the remote IPCG reachable.

The non-shareable to shareable transition may be the same as for shareable to non-shareable transition (but in reverse direction) starting from one pattern in $N_1$.

The combine pattern rewrite rule 1500 in FIG. 15 is correct if the pattern contracts of the patterns in the subsequence $SSQ_1$ can be combined to an inbound contract inContr($P_3$) of pattern $P_3$ that matches outContr($P_1$) of the preceding pattern $P_1$ and an outbound contract outContr($P_3$) matching the inContr($P_2$) of the succeeding pattern $P_2$. That is given through the rule matching only patterns of the same type and with non-conflicting, nondependent changes to the message elements. That means the pattern dependent contact parts like {(ENCR, yes)}, {(SIG, any)} are all the same due to the same type, and each pattern either modifies different data elements in {(PL, Z)} or requires read-only access, and thus the union of all accessed data elements denotes the inbound contract and the outbound contract is just the one of the last pattern in the sequence (satisfying the successor's inbound contract).

Figure 16:
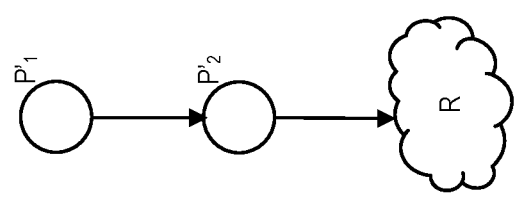
FIG. 16 shows router to routing slip pattern rewriting in accordance with some embodiments.
Figure 16:
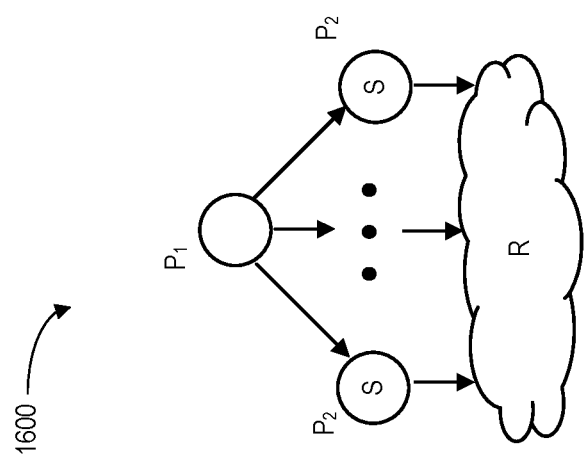

The router to routing slip rewrite rule 1600 in FIG. 16 is correct if the outbound contract outContr(P'1) of the newly added content enricher P'1 matches the inbound contract of the receiver inContr(R), and the pattern contracts of the external call pattern S accepts any configuration, same as for the transition rules before. To replace the router on the left-hand side of the rule $P_1$ with an outbound contract of:

outContr($P_1$)=((ENCR,$X$),(SIG,$Y$), . . . ,(PL,$Z$))

the enricher on the right-hand side P'1 requires the same outbound contract, but will add an additional header HDR with the routing information that was explicitly modeled before:

outContr($P'1$)=((ENCR,$X$),(SIG,$Y$), . . . ,(HDR,URL), (PL,$Z$)).

Its subsequent external call pattern S requires the header to direct the message to the correct endpoint, but either remove the header to have the same outContr(P1) as P1 on the left-hand side of the rule or the receiver has to ignore the additional header by having {(HDR, any)}, {(PL, Z)} in its inbound contract. That is given through the rule matching only endpoints in R with the same pattern contract (but different address).

For Software as a Service ("SaaS") vendors (including INTaaS), the CEPP may be considered a bin-packing problem, with a set of bins of different sizes and/or costs (e.g., platforms or variants) and a set of items of different sizes (e.g., pattern (sub-) compositions). The objective is to find a cost efficient placement or assignment of the pattern compositions under the following constraints: C1 each IPCG is in exactly one container, C2 each container is exactly one variant, C3 the container size must not be exceeded by the assigned, required IPCG capacity, C4 a no non-shareable IPCG is assigned to a container which contains compositions of a different tenant (security-awareness), and C5 the maximum number of IPCGs per container is not exceeded, which essentially means that the items can be incompatible to each other (e.g., non-shareable), and thus cannot be in the same bin or incompatible to a bin (e.g., logistic company not on competitor's platform AWS).

An optimal Mixed Integer Linear Programming ("MILP") model for CEPP may consider constraints C1 through C5. For the sake of clarity, Table 3 summarizes the notation used herein in terms of constants, results, and auxiliary variables.

TABLE 3

Overview of Variables in Cost Model

| Model | Variable | Meaning |
| --- | --- | --- |
| Const | $D_n$ | Capacity of variant n |
|  | $E_n$ | Costs of variant n |
|  | $A_i$ | Required capacity of composition i |
|  | Q | Maximum number of compositions per container |
| Result | $X_{ij}$ | Boolean indicating if composition i is in container j |
|  | $Y_{nj}$ | Container j is variant n |
| Auxiliary | C, N, F | Number of: containers, container variants, compositions |
|  | $B_j$ | Capacity of container j |
|  | $G_j$ | Costs of container j |
|  | $z_{ikj}$ | Composition k is in the same container as j as i |

The first constraint C1 ensures that every IPCG composition is placed in exactly one container by enforcing that only one of the variables $x_{ij}$ for each IPCG takes the value 1, whereas $x_{ij}$ denotes that IPCG i is placed in container j.

$$\sum_{j=1}^{C} x_{ij} = 1 \quad \forall i$$

Then ensure that for each container exactly one variant is chosen (as in constraint C2). This is accomplished by using a Boolean variable $y_{nj}$, which shows whether container j is container variant n.

$$\sum_{n=1}^{C} y_{nj} = 1 \quad \forall j$$

The used capacity (as in constraint C3) is calculated by multiplying every IPCG size Ai with the Boolean variable $x_{ij}$ and then summing up all products. It is essential that the maximum capacity $B_j$ of container j is respected.

$$\sum_{i=1}^{F} A_i \cdot x_{ij} \leq B_j \quad \forall j$$

The shareability property (as in constraint C4) is checked pair-wise IPCGs (i and k) and matches if at least one of them is non-shareable and they belong to different tenants. In that case, they must not be assigned to the same container (which is why $x_{ij}$ and $x_{kj}$ must not be 1 at the same time for every container j).

$$x_{ij} + x_{kj} \leq 1 \forall i,j,k$$

To model the maximum number of IPCGs per container (as in constraint C5) to determine the container costs while keeping the model complexity low, apply the following scheme. Instead of determining which container is used and then setting its cost to 0 via additional constraints (i.e., increasing the complexity), an additional container variant of 0 size and 0 cost is added to the data set. A container with this "zero-cost"-variant is a container which is not used, since no IPCG can be assigned to it without exceeding its size of 0. In addition, the container will not cause any costs just like a non-used container. As a consequence, the overall costs can simply be calculated as sum of all container costs:

$$\min \sum_{j=1}^{C} G_j$$

This CEPP solution is optimal, but combinatorial optimization problems are NP-hard and thus computationally intractable for practical problem sizes (i.e., the better the solution, the more calculation time). Hence, a local search heuristic tailored to CEPP may be defined that generates approximated results instead of an optimal solution. In general, local search uses one solution as a starting point and improves it iteratively by applying transformations.

Briefly, from an initial solution (i.e., using a problem-specific heuristic or random solution candidate), alterations and/or transformations to that solution are applied if they improve the solution. In this way, the solution's neighborhood (i.e., solutions reachable through one transformation) are explored by evaluating the new, improved solution using a measure acceptance criteria) which is used to guide the search. The transformations are applied iteratively until a specified termination criterion is met (e.g., empty neighborhood, time limit, fixed transformation limit, no improvements in last k steps, etc.). According to some embodiments, a form of local search called hill climbing is utilized, which only accepts transformations that lead to a better result.

While in a MILP model Boolean variables are used to indicate which IPCG is placed into which container ($x_{ij}$), which IPCG i is assigned to which container cId is represented by a tuple (i, cId), and which container cId is assigned to which variant vId by a tuple (cId, vId).

Figure 17:
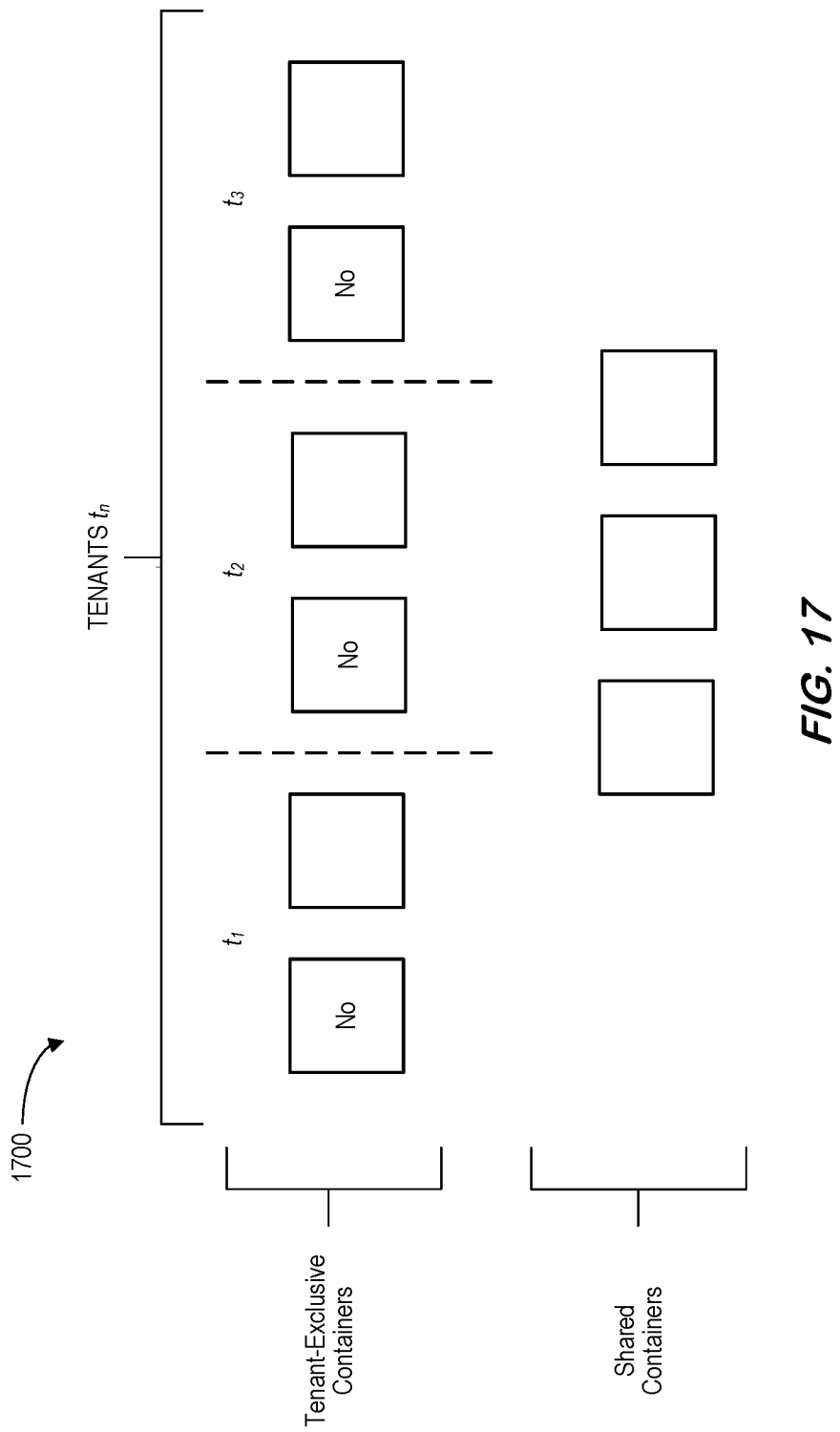
FIG. 17 illustrates container types distinguished by usage according to some embodiments.

Instead of constraints, embodiments may ensure that transformations result in feasible solutions from a feasible initial solution. For those transformations, shareable (i.e., only shareable IPCGs) and tenant-exclusive (i.e., contain at least one non-shareable IPCG of a tenant and thus can only contain IPCGs of the same tenant) containers may be defined as shown 1700 in FIG. 17. For simplicity, each container will be of one of these types without the ability to change the type during search. This is decided during creation of the initial solution and remembered by shareable shCId:=set(cId) and tenant-exclusive container identifiers tenantExCId:=Tenant×set (cId).

Figure 18:
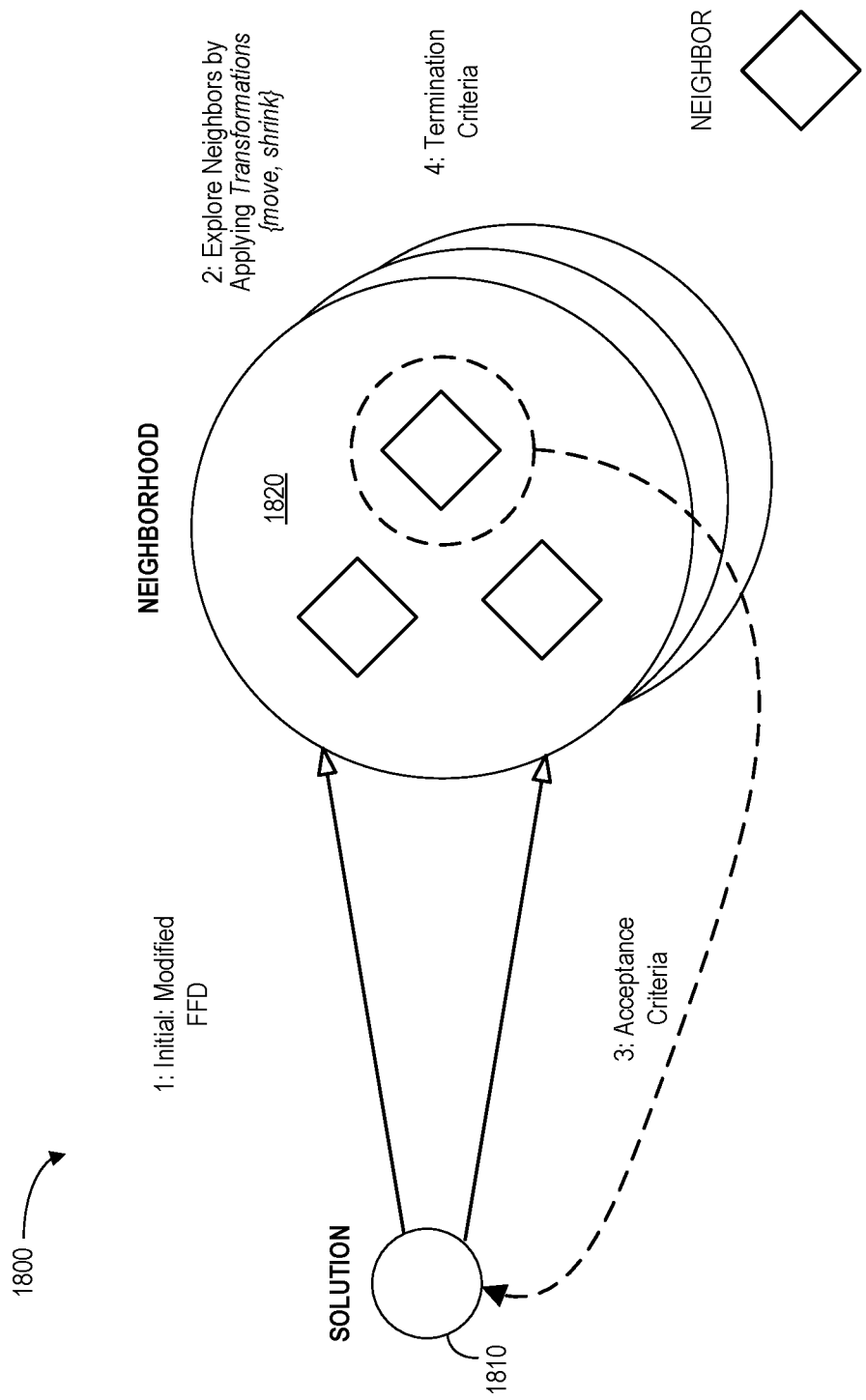
FIG. 18 shows a local search for CEPP in accordance with some embodiments.

FIG. 18 shows a local search for CEPP 1800 associated with mappings of process to contain and container to variant in accordance with some embodiments. At (1) a feasible initial solution 1810 is calculated using a modified First Fit Decreasing ("FFD") or similar algorithm. The system may then explore neighbors (in neighborhoods 1820) by applying transformations (e.g., {move, shrink}) as constraints to move to other feasible solutions at (2). At (3), acceptance criteria may be associated with an objective function in which costs are calculated by adding up the costs for all container variants. The search may continue until a termination criteria is satisfied at (4).

Figure 19:
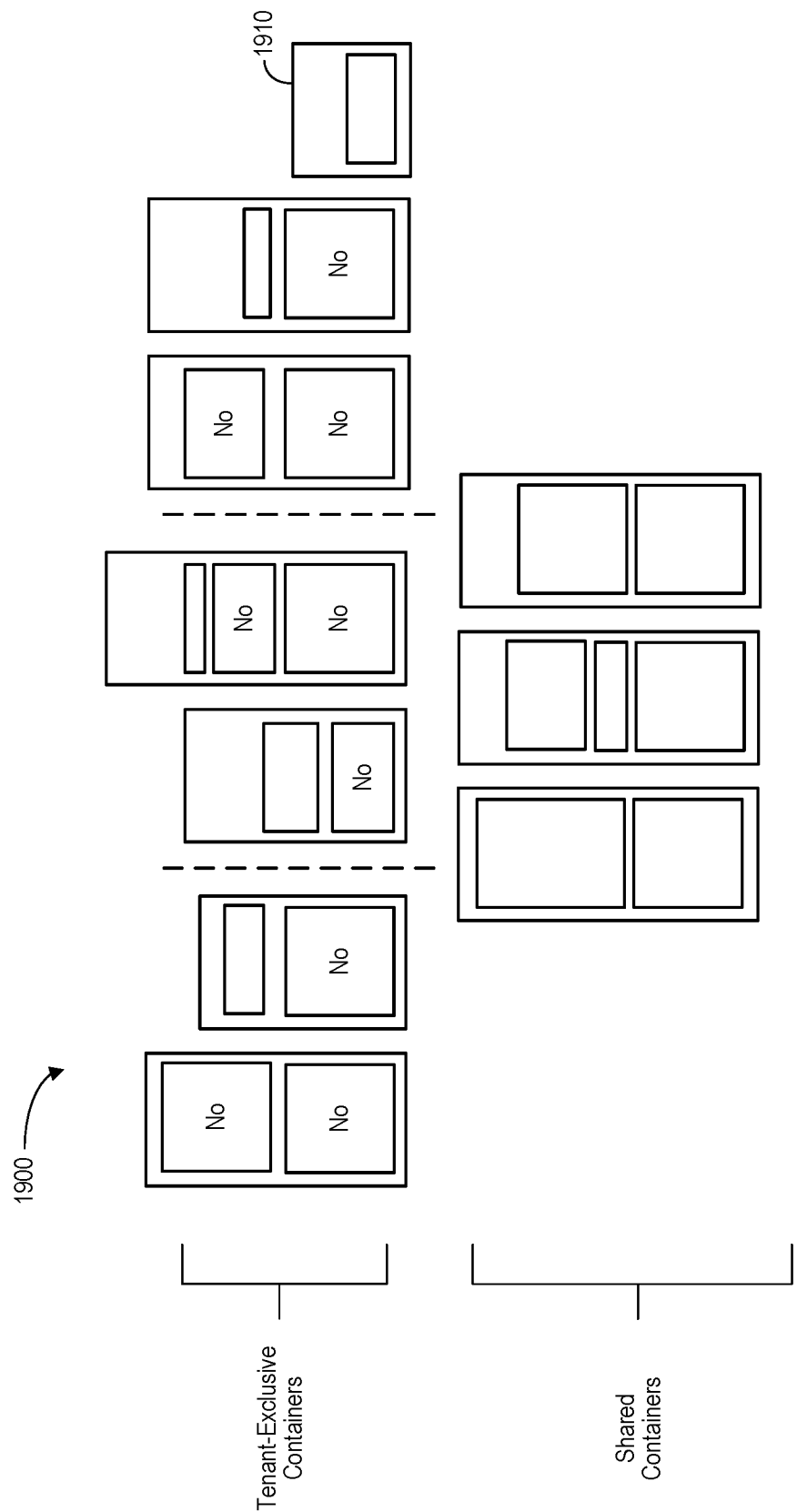
FIG. 19 is an example of container types in accordance with some embodiments.

FIG. 19 shows 1900 a CEPP example solution, where containers 1910 are grouped together as tenant-specific or shareable. The resulting total costs may be calculated by adding up the costs for all container variants, and thus represent an objective function. Unused containers 1910 are not excluded, but an artificial variant may be added to the list of possible variants, which has 0 costs and capacity.

Instead of generating a random solution, a problem-specific heuristic, such as FFD, may be utilized. FFD is a bin packing algorithm that first sorts the items descending by their size. If the current item does not fit into a bin, a new one is created, while repeating until all items are distributed. FFD may provide an appropriate runtime and a satisfactory, fixed bound for the maximum deviation $$ffd(I) \leq \frac{11}{9} \cdot OPT(I) + \frac{2}{3}.$$

Since FFD is designed to determine the number of bins for only one size, it does not need a strategy for choosing the bin's size when adding a bin. However, the CEPP is a variable size bin packing problem, i.e., with bins of different sizes. Consequently, FFD may be extended by a rule that must be specified to define the bin to choose.

The only requirement when adding a new bin is that the current item fits into the bin. This can be achieved by always choosing the biggest bin available, which would violate the goal of cost minimization. Hence, embodiments may sort the bins by their cost efficiency (i.e., the higher the costs per capacity unit, e.g., Euro/MB, the less efficient is the container), and not their sizes. When a new bin is initialized, its type will be chosen as follows: the bins are tested in the order of their efficiency, starting with the most efficient bin. If the bin is big enough to host the item it is chosen. Otherwise, the next bin is tested.

Since it is not known how many items are still going to be distributed when adding a new bin, the system does not know how "full" the container 1910 will get. However, when assuming that the container 1910 will not have much free capacity left at the end of the bin packing, the cost efficiency indicates which bins should be preferred. The more cost-efficient the bin, the less the costs at the end will be.

In normal bin packing the only constraint is denoted by the size of a bin that must not be exceeded by the packed items. But when conflicts between items are added to the problem, a distribution strategy based on FFD might not find a solution. Therefore, FFD may be additionally adapted for bin packing with conflicts.

Figure 20:
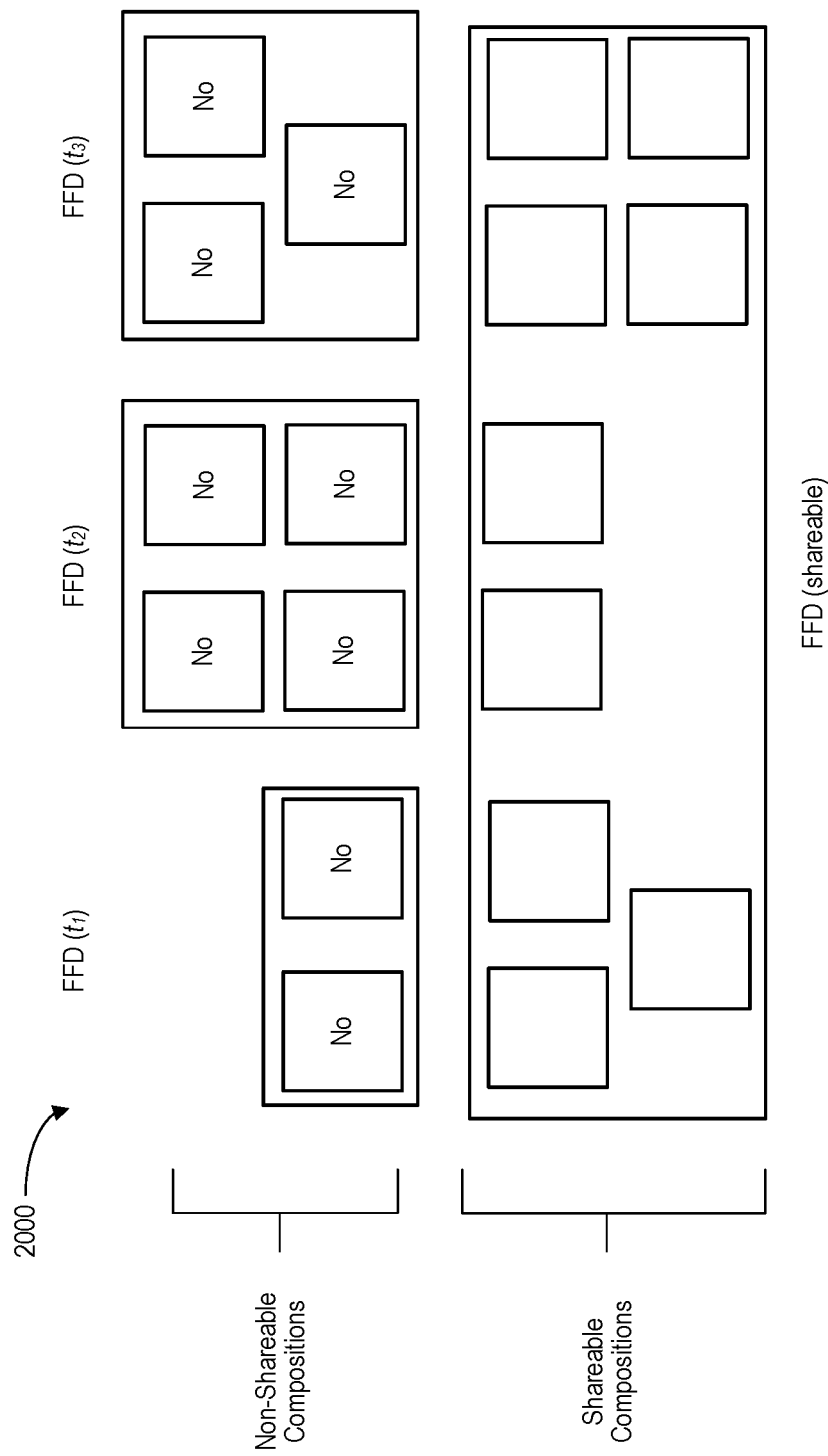
FIG. 20 is an initial solution for IPCG using FFD according to some embodiments.

When IPCGs cannot be assigned to the same bin due to a conflict (i.e., non-shareable IPCGs in combination with an IPCG from a different tenant), the system may choose a strategy based on problem decomposition that does not test each container 1910 to determine if a conflict occurs (and choosing the next one). All non-shareable IPCGs per tenant and all shareable IPCGs may be decomposed as separate sub-problems, which can also be applied when creating the initial result for the local search. When applying a variable size FFD to the sub-problems separately, no conflicts can occur within the subproblems. Thus, the modified FFD can be used to generate a feasible initial solution. For example, FIG. 20 shows 2000 how FFD is applied to non-shareable IPCG, grouped by tenant. The resulting placement into containers is depicted by rectangles and stored to shCId, tenantExCId, respectively.

For CEPP, transformations shrink and reduce may be specified to rearrange container variants with the goal of finding cheaper variants. While shrink exchanges a bin for a smaller (and cheaper) bin, reduce removes an unused one. As a second type of transformation on IPCGs move may rearrange the IPCG placement by moving an IPCG to a different container. Notice that simply applying reordering transformations on IPCGs alone would not reduce the overall costs. Finally, a swap transformation may exchange two IPCGs from different containers that results in better compaction within containers.

These four transformations may be associated with pre- and post-condition pairs that first show the intended change as precondition (before the transformation is applied) and the desired post-condition as the result (after a viable transformation was accepted). The transformations guarantee conflict-free solutions by moving IPCGs only to those container types (shCId or tenantExCId) that are allowed according to their properties. Since it cannot be guaranteed that the container size is not exceeded, this is checked by the acceptance criteria.

To move IPCGs between containers, one random IPCG is chosen, and then possible containers are determined (to which it can be moved) depending on its shareability characteristic. If the IPCG is non-shareable, only containers from tenantExCId are allowed, otherwise shareable containers from shCId can also be used. From the possible containers, one is randomly chosen and the IPCG is assigned to it. A prerequisite for moving an IPCG is that the chosen container 1910 has enough free space, otherwise the move is discarded by the acceptance criteria. FIG. 21A illustrates a pre-condition 2110 for a move transformation 2112 according to some embodiments, and FIG. 21B illustrates a post-condition 2120 of the containers after the move transformation (with container 2122 now being empty).

Figure 22A:
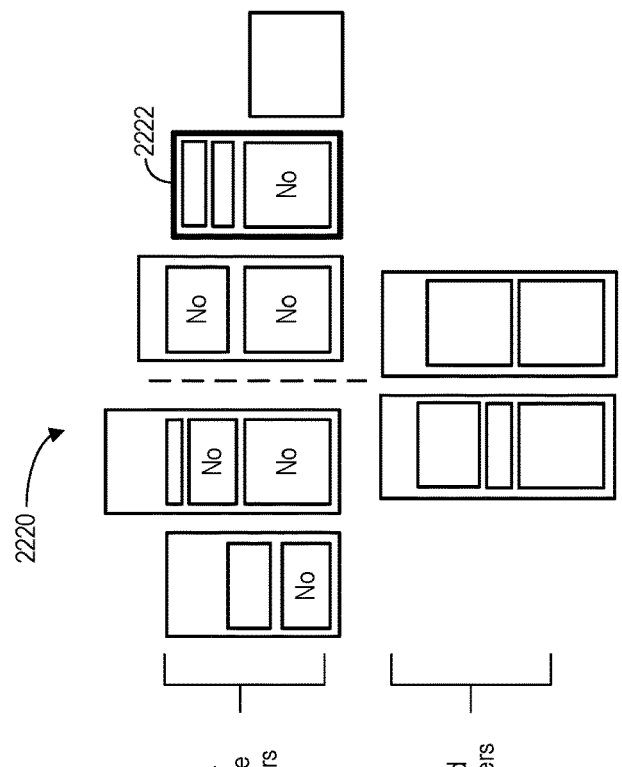
FIGS. 22A and 22B illustrate exchanging a container variant with a smaller variant in accordance with some embodiments.
Figure 22B:
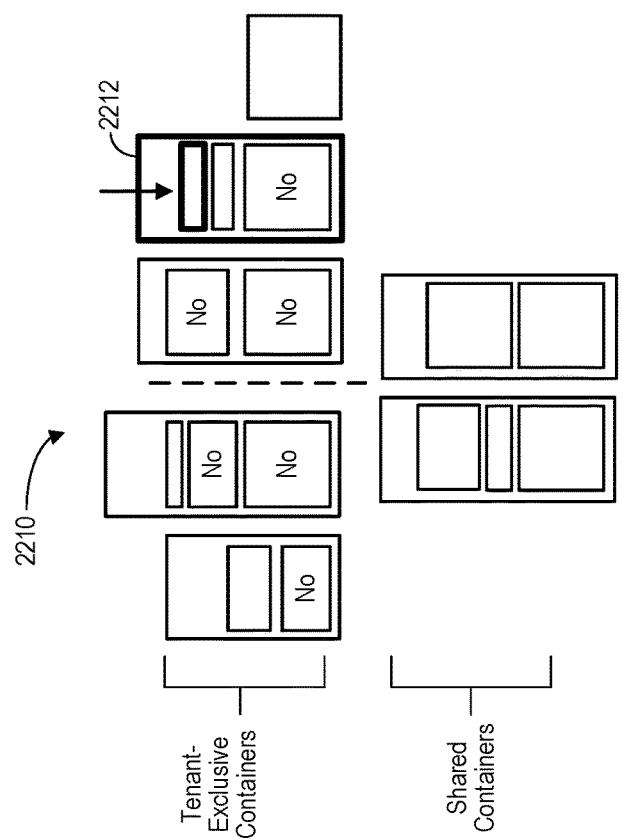

The shrink transformation randomly selects a container and changes its variant. The possible variants are ordered by their size, assuming that most expensive variants were removed beforehand. The transformation looks up the variant identifier vId assigned to a container in cId, vId and reduces the number by 1. Due to the ordered variants, a smaller variant identifier means a smaller and cheaper variant (thus reducing the total cost). If the capacity of the new container would be exceeded, the transformation is revoked. This transformation cannot be applied to the smallest container variants (i.e., with vId==0). FIG. 22A illustrates a pre-condition 2210 for a shrink transformation 2212 according to some embodiments, and FIG. 22B illustrates a post-condition 2220 of the containers after the shrink transformation (with container 2222 now reduced in size).

Figure 23B:
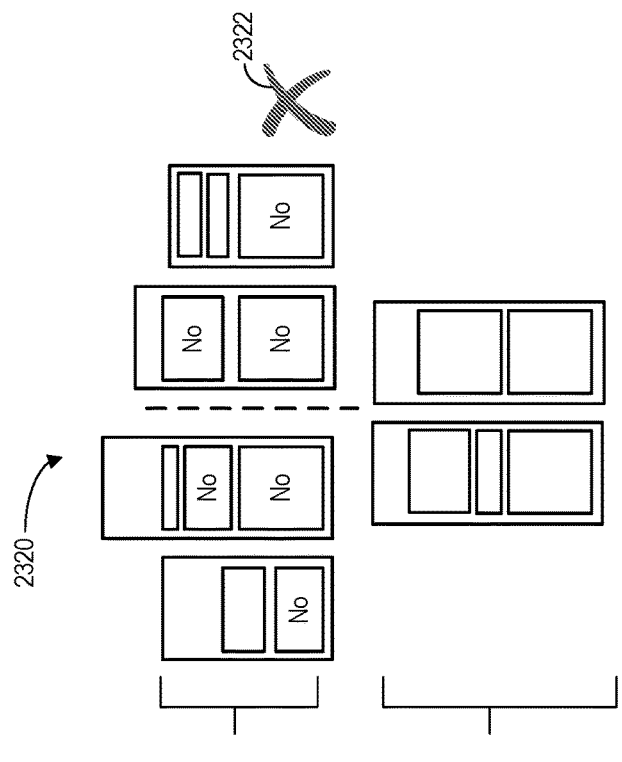
FIGS. 23A and 23B illustrate removing a container by assigning a variant of zero size and cost according to some embodiments.
Figure 23A:
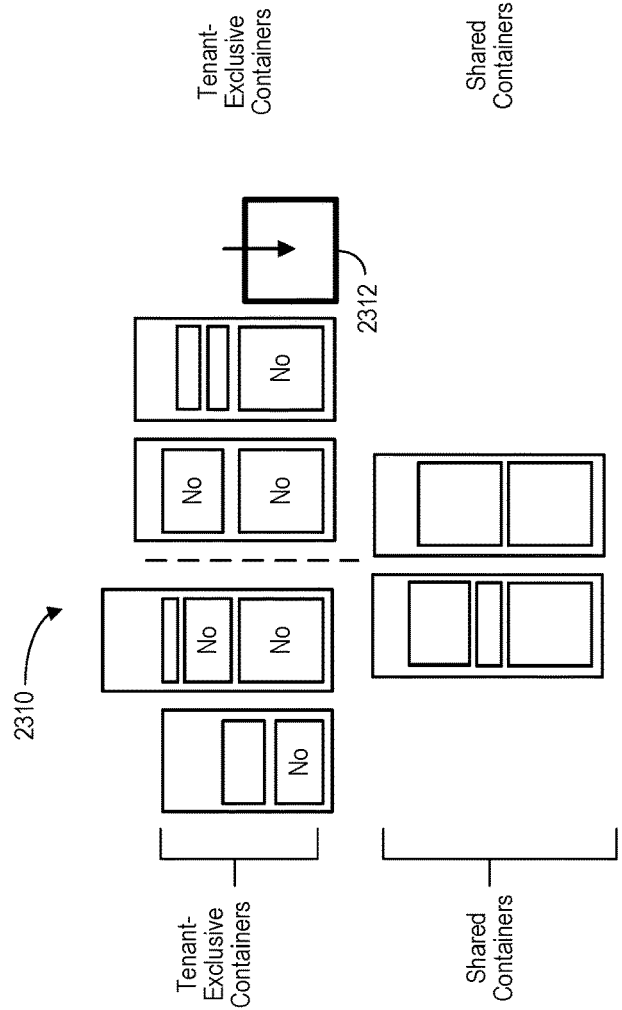

If a solution (inkling the initial solution) generates too many containers, some of them should be removed via a remove transformation. A removed container is the same as a container which is not used. Since an additional variant with 0 size and costs was added, this transformation is applied implicitly when a container is shrunk to this variant or a container is moved, leaving a container empty. FIG. 23A illustrates a pre-condition 2310 for a remove transformation 2312 according to some embodiments, and FIG. 23B illustrates a post-condition 2320 of the containers after the move transformation (with the container now deleted 2322).

Figure 24B:
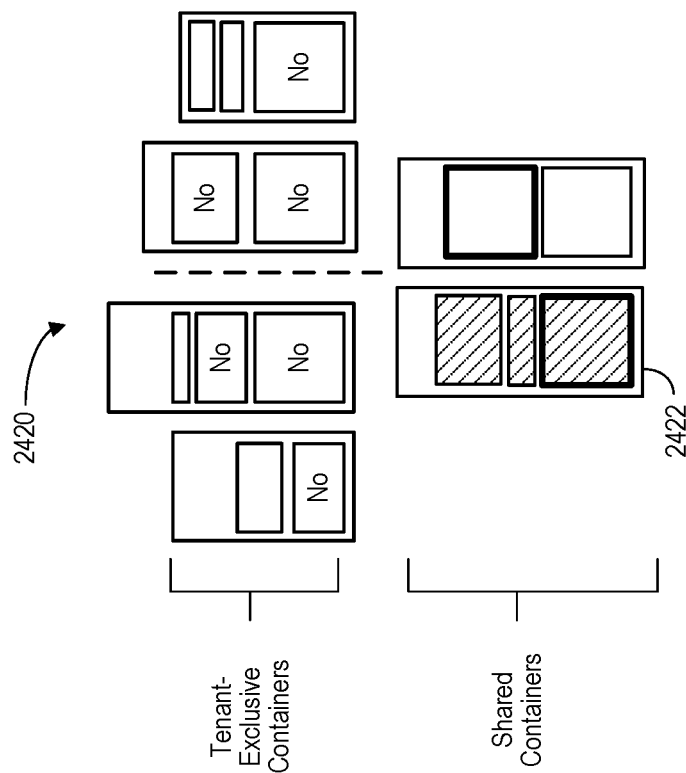
FIGS. 24A and 24B illustrate swapping a container in accordance with some embodiments.
Figure 24A:
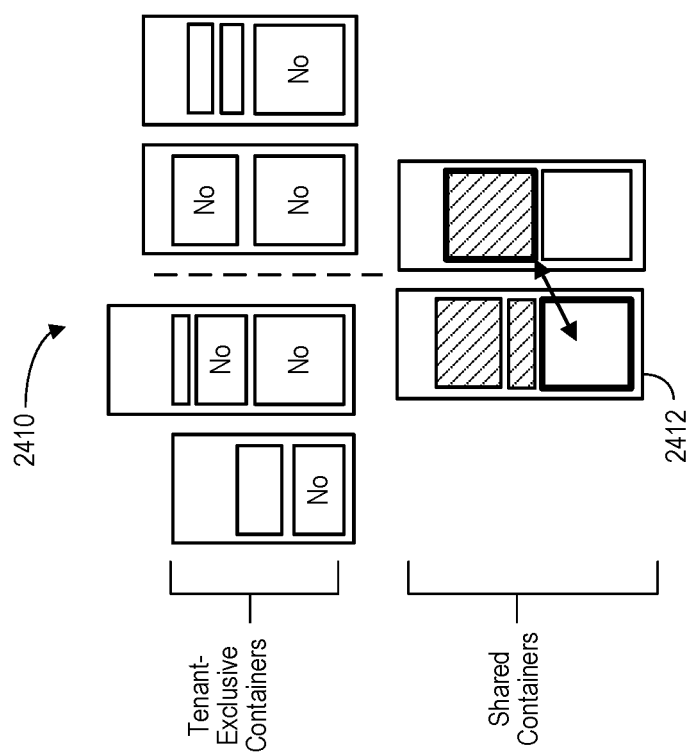

A swap transformation may exchange two IPCGs between different containers. In this transformation, two IPCGs are chosen randomly and moved to the other container (and vice versa). The prerequisites for exchanging two compositions are (a) that either both IPCGs are shareable (i.e., currently in shCId) or both of their containers are in tenantExCId, and (b) that both containers have enough free space. Otherwise, the swap transformation is discarded by the acceptance criteria. FIG. 24A illustrates a pre-condition 2410 for a swap transformation 2412 according to some embodiments, and FIG. 24B illustrates a post-condition 2420 of the containers after the swap transformation 2422.

Some embodiments may utilize the following CEPP local search algorithm:

```
1    Generate initial solution: CEPP-FFD;
2    while Maximum number of transformations not exceeded do
3        foreach transformation ∈ {Move, Shrink, Swap} do
4            Apply transformation;
5            if Solution is feasible and better or equal to original
                Solution then
6                Accept transformation;
7            else
8                Discard transformation;
9        end
10   end
11   end
```

The initial result may be generated using a modified FFD algorithm separately for non-shareable IPCGs per tenant and all shareable IPCGs (line 1). Then move, shrink, and swap transformations are iteratively applied to the initial solution, which is modified with the goal to reduce costs (line 4). A transformation is accepted if the modified solution is feasible and in addition to has lower or equal costs (line 6). The search is terminated when all transformations were applied.

Figure 25:
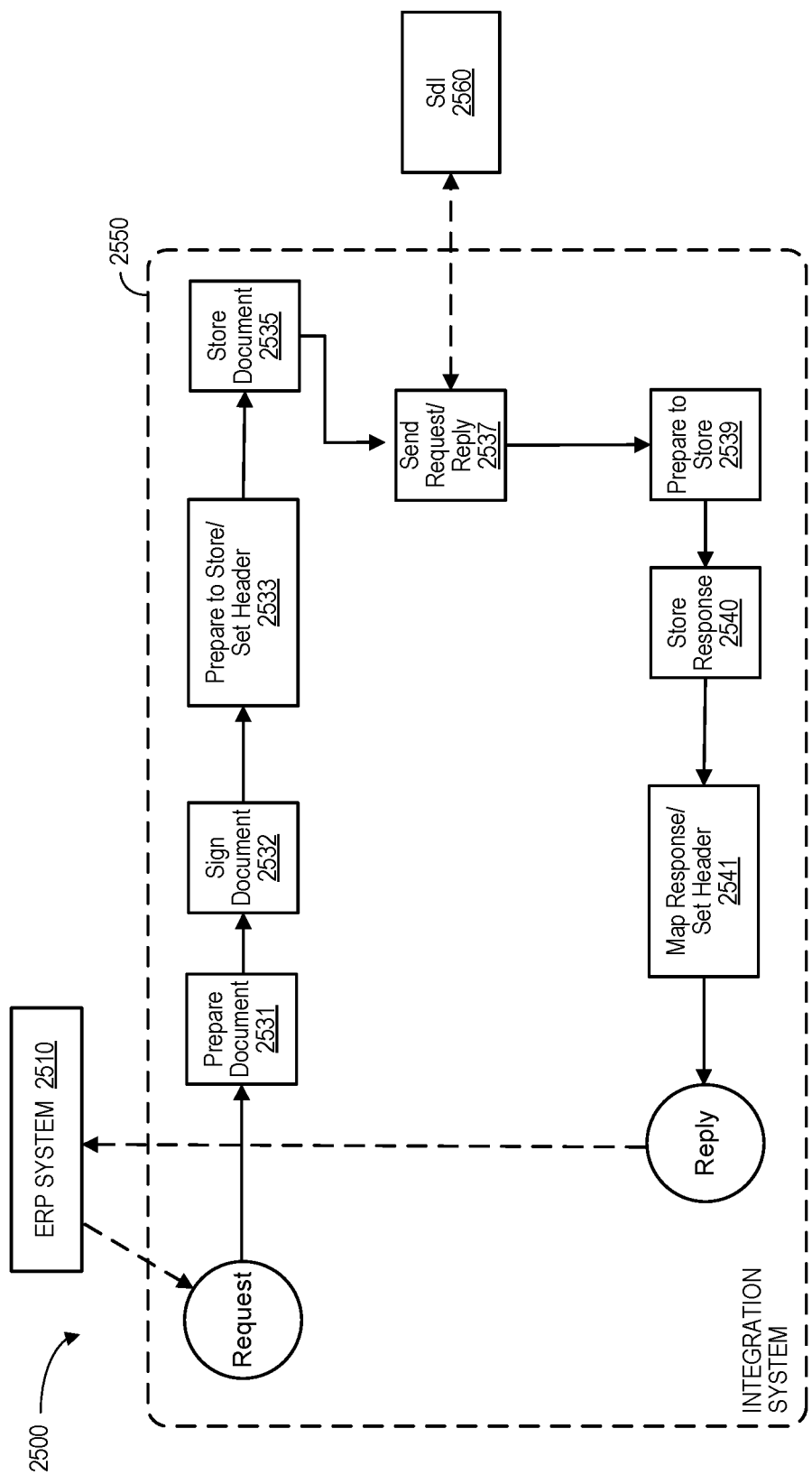
FIG. 25 is a more cost-efficient version of the invoicing integration process of FIG. 4, according to some embodiments.

The rewriting rules may be applied to the Italian invoice process 400 illustrated in FIG. 4 and the results 2500 of the cost-aware process are depicted in FIG. 25. Initially, an integration system 2550 receives a request associated with an invoice document from an ERP system 2510. At 2531, the document is prepared and signed at 2532. At 2533, a content enricher instances prepare to store and setHeader are merged by combining their configurations (e.g., expressions). This is allowed because their changes are not overlapping with the signer pattern. Similarly, the content enricher instances map response and setHeader of 2541 can be merged. At 2535 the document is stored, and at 2537 a send request/reply is exchanged with SdI 2560. The integration system 2550 may then prepare to store at 2539, store the response at 2540, and map response/set header 2541 before replying to the ERP system 2510. Note that the explicit differentiation of SdI-Test and SdI-Production in the process, represented by a Content-based Router and two Request-Reply patterns, are moved to an implicit configuration. This lets the system remove the router as well as the additional end (edge invalid mode) and one request-reply pattern. The routing conditions on mode of the modeled content-based router pattern are mapped to implicit routing configurations as an endpoint URL in the form of a content enricher (essentially forming a routing slip pattern), which is subsequently merged into the newly created combined map response/set header 2541. These changes reduce the process by five patterns and make it now fit into a smaller container (which would reduce the UR/month costs).

Figure 26:
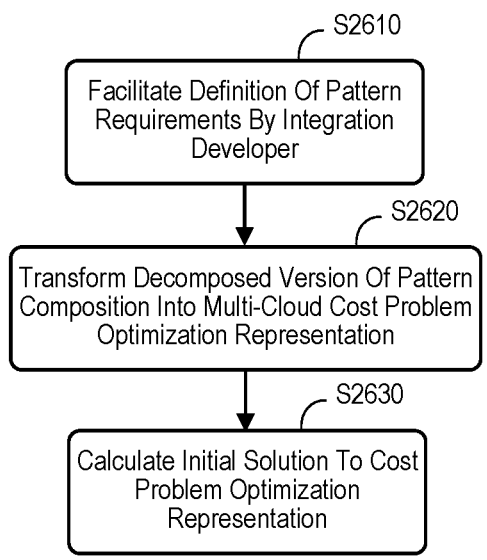
FIG. 26 is a method in accordance with some embodiments.

FIG. 26 is a method in accordance with some embodiments. At S2610, a modeling platform may determine a pattern composition for an integration process associated with a business application. At S2620, a cost-aware platform may transform a decomposed version of the pattern composition, including a plurality of IPCGs, into a multi-cloud cost problem optimization representation. The multi-cloud computing environment may, for example, include a first multi-tenant cloud vendor and a second multi-tenant cloud vendor, and multi-cloud costs are associated with the first and second vendors. Moreover, the decomposed version of the pattern composition might be via graph rewriting associated with a sharable to non-sharable transition and/or a non-sharable to sharable transition. As other examples, the decomposed version of the pattern composition might be created via graph rewriting associated with: process simplification (e.g., redundant sub-process removal, combine sibling parameters, unnecessary conditional fork, combine neighbors, and routing to routing slip); data reduction (e.g., early-filter, early-mapping, early-aggregation, claim check, and early-split); and/or parallelization, (e.g., sequence to parallel and merge parallel sub-processes). The cost problem optimization representation might be associated with, for example, variant capacity, variant cost, required capacity of composition, a maximum number of compositions per container, a number of containers, a number of container variants, a number of compositions, a container capacity, a container cost, etc.

At S2630, calculating an initial solution to the cost problem optimization representation using, for example, a modified first fit decreasing bin packing algorithm to determine a configuration of multi-cloud containers and IPCG container assignments. The first fit decreasing bin packing algorithm may be modified, for example, in connection with variable size bin backing and/or bin packing with conflicts. At S2640, the system may iteratively and locally improve the solution by applying feasible transformations to create variant container configurations and IPCG container assignments that are evaluated based on multi-cloud costs. According to some embodiments, transformations are feasible in connection with acceptance criteria, such as a capacity and/or shareability. Moreover, transformations may be associated with a move, a shrink, a remove, and a swap. When a termination criteria is satisfied, outputting an indication of the improved solution at 52650. The termination criteria may for example, include an empty neighborhood, a time limit, a fixed transformation limit, no improvements in last k steps, etc. The indication output by the cost-aware platform might be associated with a notification to a modeler, a recommended change to the pattern composition, a change that is automatically applied to the pattern composition, etc. In this way, process costs may be associated with "user-in-the-loop" cost control during process modeling and/or process correctness.

Figure 27:
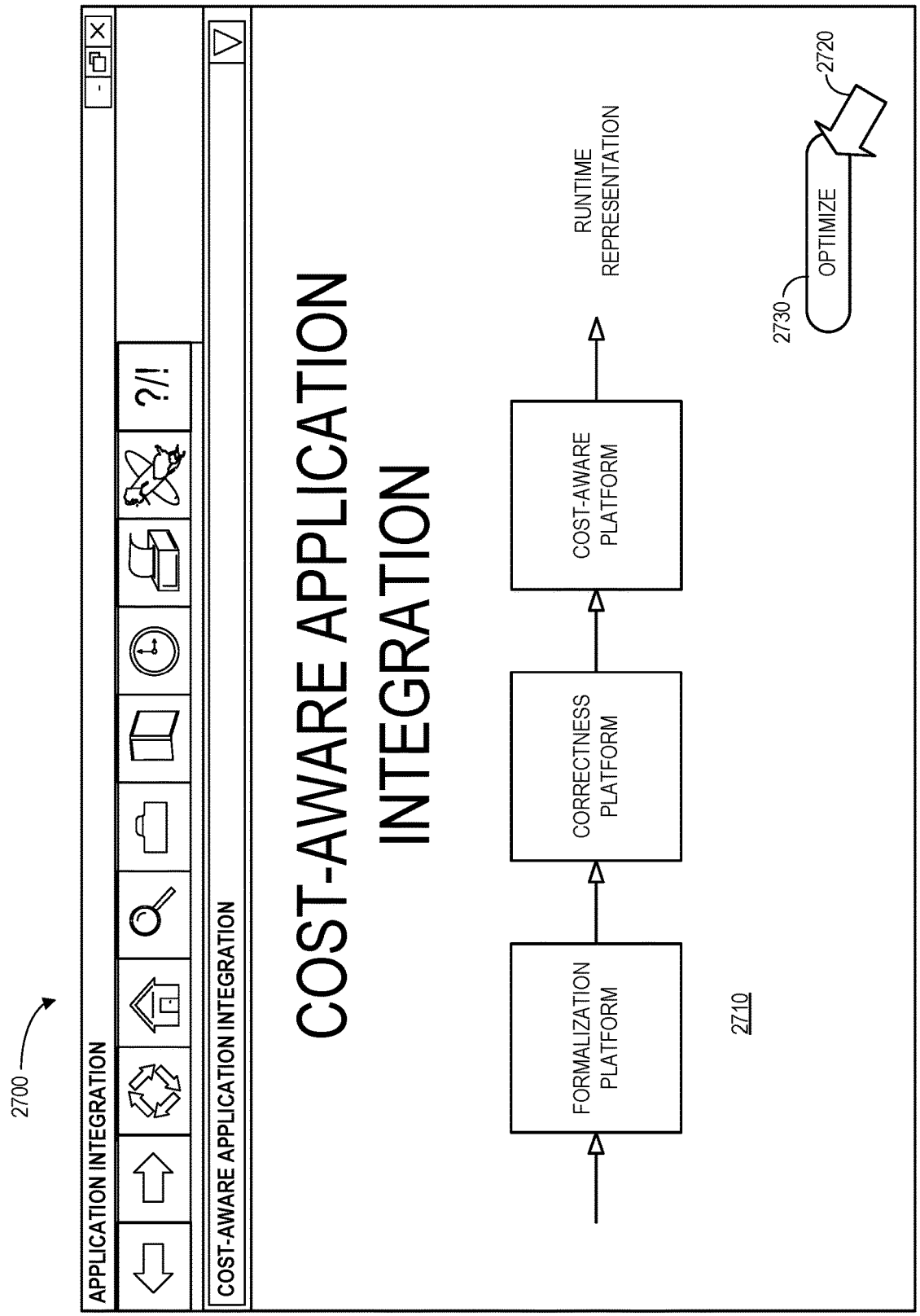
FIG. 27 is a human-machine interface display according to some embodiments.

FIG. 27 is a human machine interface display 2700 in accordance with some embodiments. The display 2700 includes a graphical representation 2710 of a cost-aware application integration system in accordance with any of the embodiments described herein. Selection of an element on the display 2700 (e.g., via a touchscreen or a computer pointer 2720) may result in display of a pop-up window containing more detailed information about that element and/or various options (e.g., to add adjust cost optimization strategies, select formalization parameters, etc.). Selection of an "Optimize" icon 2730 may also let an operator or administrator initiate or finalize operation of the application integration system.

Figure 2:
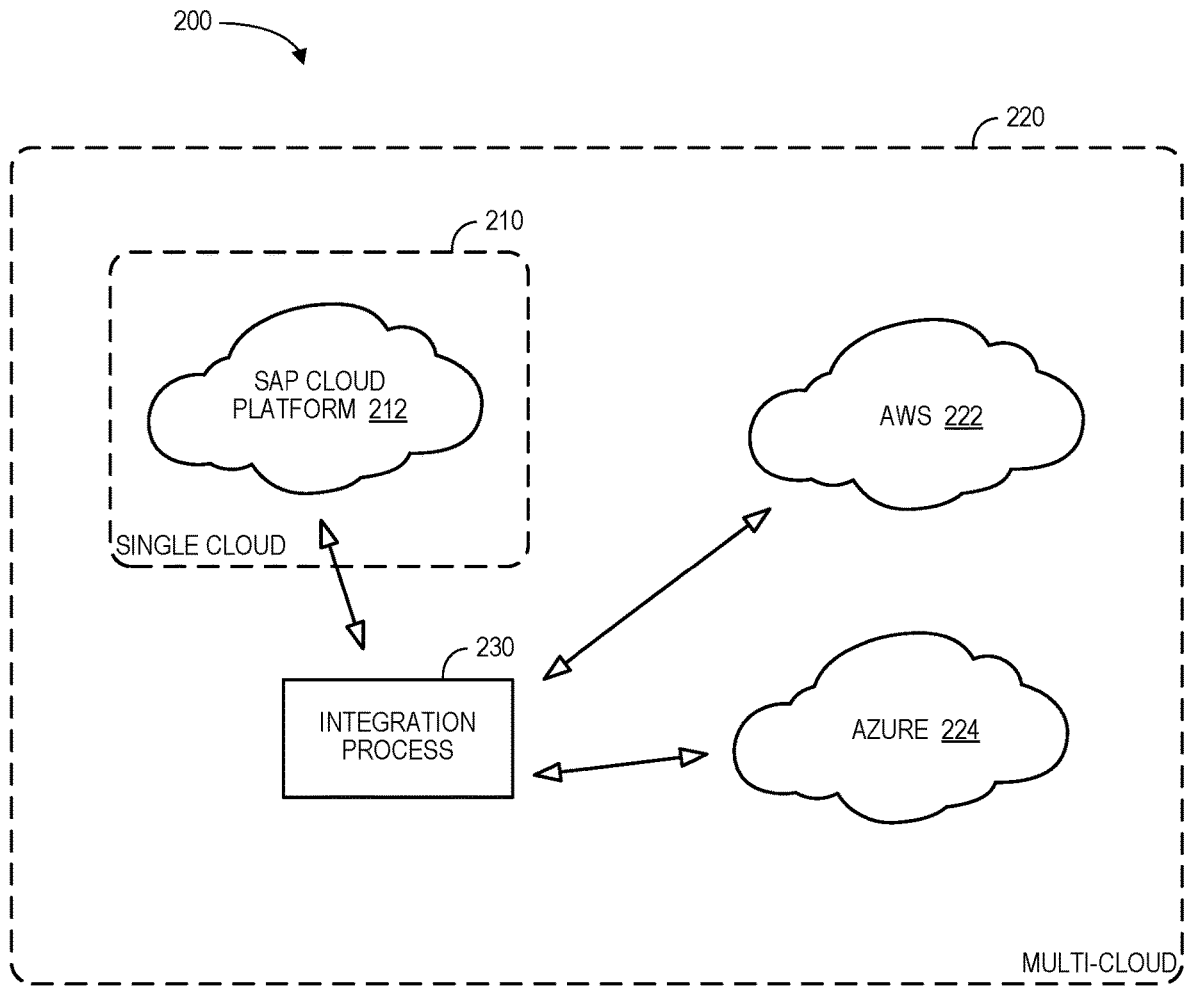
FIG. 2 is a system associated with a cloud computing environment in accordance with some embodiments.
Figure 28:
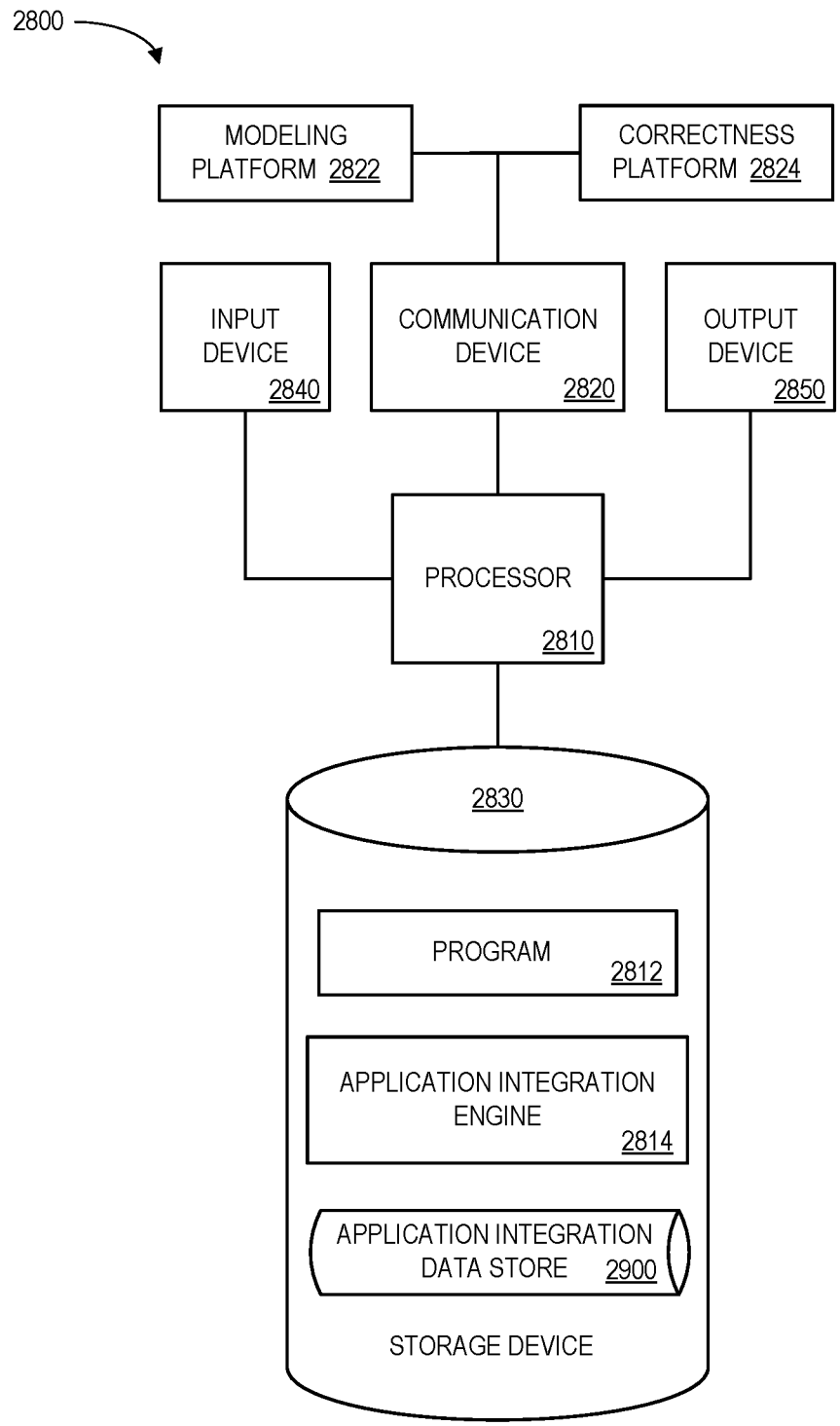
FIG. 28 is an apparatus or platform according to some embodiments.

Note that the embodiments described herein may be implemented using any number of different hardware configurations. For example, FIG. 28 is a block diagram of an apparatus or platform 2800 that may be, for example, associated with the system 200 of FIG. 2 (and/or any other system described herein). The platform 2800 comprises a processor 2810, such as one or more commercially available Central Processing Units ("CPUs") in the form of one-chip microprocessors, coupled to a communication device 2820 configured to communicate via a communication network (not shown in FIG. 28). The communication device 2820 may be used to communicate, for example, with one or more remote administrator platforms, modeling platforms 2822, correctness platforms 2824, etc. The platform 2800 further includes an input device 2840 (e.g., a computer mouse and/or keyboard to input formalization and cost optimization information) and/or an output device 2850 (e.g., a computer monitor to render a display, transmit cost optimization recommendations, and/or create reports about application integration, benchmark results, etc.). According to some embodiments, a mobile device, monitoring physical system, and/or PC may be used to exchange information with the platform 2800.

The processor 2810 also communicates with a storage device 2830. The storage device 2830 may comprise any appropriate information storage device, including combinations of magnetic storage devices (e.g., a hard disk drive), optical storage devices, mobile telephones, and/or semiconductor memory devices. The storage device 2830 stores a program 2812 and/or an application integration engine 2814 for controlling the processor 2810. The processor 2810 performs instructions of the programs 2812, 2814, and thereby operates in accordance with any of the embodiments described herein. For example, the processor 2810 might transform a decomposed version of the pattern composition, including a plurality of IPCGs, into a multi-cloud cost problem optimization representation. An initial solution to the cost problem representation may be calculated by the processor 2810 using, for example, a modified first fit decreasing bin packing algorithm to determine a configuration of multi-cloud containers and IPCG container assignments. The processor 2810 may then iteratively and locally improve the solution to by applying feasible transformations to create variant container configurations and IPCG container assignments that are evaluated based on multi-cloud costs (keeping the user in-the-loop). When a termination criteria is satisfied, an indication of the improved solution may be output by the processor.

The programs 2812, 2814 may be stored in a compressed, uncompiled and/or encrypted format. The programs 2812, 2814 may furthermore include other program elements, such as an operating system, clipboard application, a database management system, and/or device drivers used by the processor 2810 to interface with peripheral devices.

As used herein, information may be "received" by or "transmitted" to, for example: (i) the platform 2800 from another device; or (ii) a software application or module within the platform 2800 from another software application, module, or any other source.

In some embodiments (such as the one shown in FIG. 28), the storage device 2830 further stores an application integration data store 2900. An example of a database that may be used in connection with the platform 2800 will now be described in detail with respect to FIG. 29. Note that the database described herein is only one example, and additional and/or different information may be stored therein. Moreover, various databases might be split or combined in accordance with any of the embodiments described herein.

Figure 29:
FIG. 29 is portion of an application integration data store in accordance with some embodiments.

Referring to FIG. 29, a table is shown that represents the application integration data store 2900 that may be stored at the platform 2800 according to some embodiments. The table may include, for example, entries associated with an application implemented via a cloud computing environment. The table may also define fields 2902, 2904, 2906, 2908, 2910 for each of the entries. The fields 2902, 2904, 2906, 2908, 2910 may, according to some embodiments, specify: an IPCG identifier 2902, a decomposed version 2904, cost information 2906, an initial solution 2908, and an improved container configuration solution 2910. The application integration data store 2900 might be created and updated, for example, a model designer creates a new application, additional application integrations are modified or deployed, cloud cost structures are modified, etc.

The IPCG identifier 2902 might be a unique alphanumeric label that is associated with a contract graph and/or integration designer in accordance with any of the embodiments described herein. The decomposed version 2904 may be created, for example, via graph rewriting associated with process simplification, data reduction, parallelization, etc. The cost information 2906 might be associated with costs for a first multi-tenant cloud vendor and a second multi-tenant cloud vendor (e.g., a maximum number of compositions per container, a container cost, etc.). The initial solution 2908 might, according to some embodiments, be calculated using an algorithm, such as a FFD bin packing algorithm (modified for variable size bin backing and/or bin packing with conflicts), to determine a configuration of multi-cloud containers and IPCG container assignments. The improved container configuration solution 2910 might be iteratively and locally determined by applying feasible transformations to create variant container configurations and IPCG container assignments that are evaluated based on multi-cloud costs. The improved container configuration solution 2910 might, for example, be included in a notification to a modeler, a recommended change to the pattern composition, and/or a change that is automatically applied to the pattern composition.

Thus, embodiments may provide cost-aware application integration in a secure, automatic, and efficient manner. Some embodiments may provide a solution for a cost-efficient process placement problem for integration processes in multi-cloud. SaaS and/or INTaaS vendors can cut costs when using these approaches. Although the complexity of the CEPP makes an optimal solution intractable, local search heuristics allow for more timely calculations in the context of cost-aware modeling. The cost-aware modeling process may help an INTaaS customer reduce costs and simplify their integration process models/configurations while assuring their structural correctness.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 30:
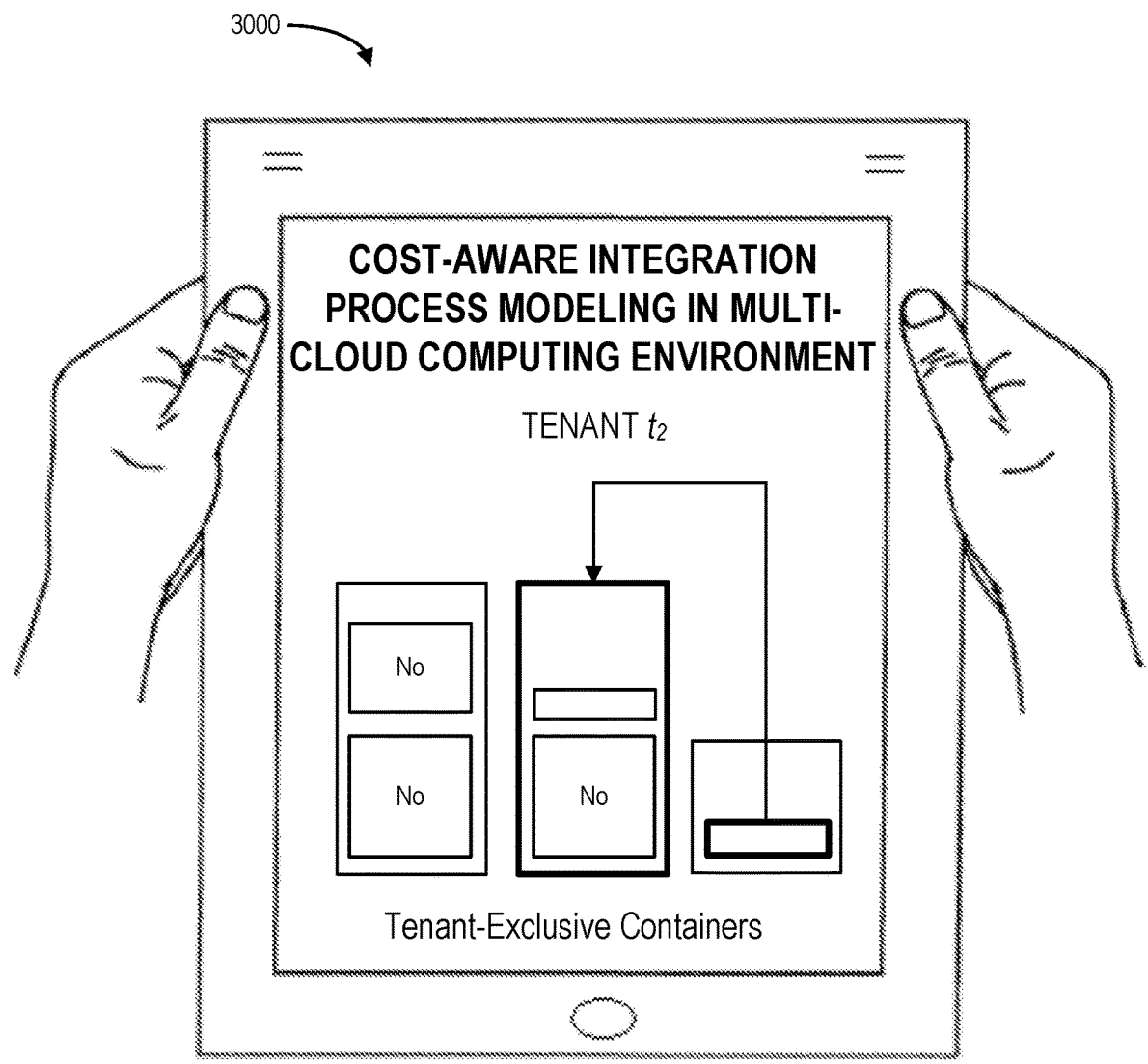
FIG. 30 is a tablet computer providing a cost-aware application integration display according to some embodiments.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of application integrations and microservices, any of the embodiments described herein could be applied to other types of applications. Moreover, the displays shown herein are provided only as examples, and any other type of user interface could be implemented. For example, FIG. 30 illustrates a tablet computer 3000 with cost-aware integration display 3010. The display 3010 might be used, for example, by an operator or administration to configure a model for a multi-cloud computing environment (e.g., by assigning various tenant process compositions to specific platform vendor containers, etc.).

Any of the embodiments described herein might incorporate dynamic aspects into the formalization of patterns for a more precise cost semantics. In addition, purely data related techniques (e.g., message indexing, fork path re-ordering, and/or merging of conditions) may be analyzed for their effects. Moreover, multi-objective optimizations and heuristics for graph rewriting on the process level may be implemented in connection with any of these embodiments. Further note that embodiments may utilize other types of optimization, such as pattern placement optimizations (pushing patterns to message endpoints, i.e., sender and receiver applications), optimizations that reduce interactions (helping to stabilize the process), etc.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system associated with application integration in a multi-cloud computing environment, comprising:
   a modeling platform to determine a pattern composition for an integration process associated with a business application; and
   a cost-aware platform, including:
      a computer processor, and
      computer memory, coupled to the computer processor and storing instructions that, when executed by the computer processor, cause the cost-aware platform to:
      (i) transform a decomposed version of the pattern composition, including a plurality of integration pattern contract graphs, into a multi-cloud cost problem optimization representation, wherein the decomposed version of the pattern composition is created via graph rewriting that is associated with: a transition between sharable and non-sharable; data reduction; and parallelization,
      (ii) calculate an initial solution to the cost problem optimization representation using an algorithm to determine a configuration of multi-cloud containers and integration pattern contract graph container assignments,
      (iii) iteratively and locally improve the solution to by applying feasible transformations to create variant container configurations and integration pattern contract graph container assignments that are evaluated based on multi-cloud costs, and
      (iv) when a termination criteria is satisfied, output an indication of the improved solution.

2. The system of claim 1, wherein the multi-cloud computing environment includes a first multi-tenant cloud vendor and a second multi-tenant cloud vendor, and the multi-cloud costs are associated with the first and second vendors.

3. The system of claim 1, further comprising:
   a correctness platform, coupled to the modeling platform, to evaluate structural and semantic correctness of the pattern composition.

4. The system of claim 1, wherein the graph rewriting is further associated with at least one of: (i) process simplification, (ii) redundant sub-process removal, (iii) combine sibling parameters, (iv) unnecessary conditional fork, (v) combine neighbors, and (vi) routing to routing slip.

5. The system of claim 1, wherein the graph rewriting is further associated with at least one of: (i) early-filter, (ii) early-mapping, (iii) early-aggregation, (iv) claim check, and (v) early-split.

6. The system of claim 1, wherein the graph rewriting is further associated with at least one of: (i) sequence to parallel, (iii) (ii) merge parallel sub-processes.

7. The system of claim 1, wherein the cost problem optimization representation is associated with at least one of: (i) variant capacity, (ii) variant cost, (iii) required capacity of composition, (iv) a maximum number of compositions per container, (v) a number of containers, (vi) a number of container variants, (vii) a number of compositions, (viii) a container capacity, and (ix) a container cost.

8. The system of claim 1, wherein the algorithm comprises a modified first fit decreasing bin packing algorithm.

9. The system of claim 8, wherein the first fit decreasing bin packing algorithm is modified in connection with at least one of: (i) variable size bin backing, and (ii) bin packing with conflicts.

10. The system of claim 1, wherein transformations are feasible in connection with at least one of: (i) acceptance criteria, (ii) a capacity, and (iii) shareability.

11. The system of claim 1, wherein transformations are associated with at least one of: (i) a move, (ii) a shrink, (iii) a remove, and (iv) a swap.

12. The system of claim 1, the termination criteria include at least one of: (i) an empty neighbourhood, (ii) a time limit, (iii) a fixed transformation limit, and (iv) no improvements in last k steps.

13. The system of claim 1, wherein the indication output by the cost-aware platform is associated with at least one of: (i) a notification to a modeler, (ii) a recommended change to the pattern composition, and (iii) a change that is automatically applied to the pattern composition.

14. A computer-implemented method associated with application integration in a multi-cloud computing environment, comprising:
   determining, by a modeling platform, a pattern composition for an integration process associated with a business application;
   transforming, by a cost-aware platform, a decomposed version of the pattern composition, including a plurality of integration pattern contract graphs, into a multi-cloud cost problem optimization representation, wherein the decomposed version of the pattern composition is created via graph rewriting that is associated with: a transition between sharable and non-sharable; data reduction; and parallelization;
   calculating an initial solution to the cost problem optimization representation using an algorithm to determine a configuration of multi-cloud containers and integration pattern contract graph container assignments;
   iteratively and locally improving the solution by applying feasible transformations to create variant container configurations and integration pattern contract graph container assignments that are evaluated based on multi-cloud costs; and
   when a termination criteria is satisfied, outputting an indication of the improved solution.

15. The method of claim 14, wherein the cost problem optimization representation is associated with at least one of: (i) variant capacity, (ii) variant cost, (iii) required capacity of composition, (iv) a maximum number of compositions per container, (v) a number of containers, (vi) a number of container variants, (vii) a number of compositions, (viii) a container capacity, and (ix) a container cost.

16. The method of claim 14, wherein the algorithm comprises a first fit decreasing bin packing algorithm modified in connection with at least one of: (i) variable size bin backing, and (ii) bin packing with conflicts.

17. A non-transitory, computer-readable medium storing instructions, that, when executed by a processor, cause the processor to perform a method associated with application integration in a multi-cloud computing environment, the method comprising:
   determining, by a modeling platform, a pattern composition for an integration process associated with a business application;
   transforming, by a cost-aware platform, a decomposed version of the pattern composition, including a plurality of integration pattern contract graphs, into a multi-cloud cost problem optimization representation, wherein the decomposed version of the pattern composition is created via graph rewriting that is associated with: a transition between sharable and non-sharable; data reduction; and parallelization;
   calculating an initial solution to the cost problem optimization representation using a modified first fit decreasing bin packing algorithm to determine a configuration of multi-cloud containers and integration pattern contract graph container assignments;
   iteratively and locally improving the solution by applying feasible transformations to create variant container configurations and integration pattern contract graph container assignments that are evaluated based on multi-cloud costs; and
   when a termination criteria is satisfied, outputting an indication of the improved solution.

18. The medium of claim 17, wherein transformations are feasible in connection with at least one of: (i) acceptance criteria, (ii) a capacity, and (iii) shareability.

19. The medium of claim 17, wherein transformations are associated with at least one of: (i) a move, (ii) a shrink, (iii) a remove, and (iv) a swap.

20. The medium of claim 17, the termination criteria include at least one of: (i) an empty neighbourhood, (ii) a time limit, (iii) a fixed transformation limit, and (iv) no improvements in last k steps.

21. The medium of claim 17, wherein the indication output by the cost-aware platform is associated with at least one of: (i) a notification to a modeler, (ii) a recommended change to the pattern composition, and (iii) a change that is automatically applied to the pattern composition.

* * * * *